(12) United States Patent
Monaghan

(10) Patent No.: US 7,865,409 B1
(45) Date of Patent: Jan. 4, 2011

(54) VEHICLE INVENTORY MANAGEMENT SYSTEM AND METHOD

(76) Inventor: Timothy A. Monaghan, 6616 Roxton, Amarillo, TX (US) 79109

( * ) Notice: Subject to any disclaimer, the term of this patent is extended or adjusted under 35 U.S.C. 154(b) by 346 days.

(21) Appl. No.: 12/027,348

(22) Filed: Feb. 7, 2008

Related U.S. Application Data

(63) Continuation of application No. 11/368,736, filed on Mar. 6, 2006.

(51) Int. Cl.
G06F 17/50 (2006.01)
G07G 1/00 (2006.01)
G06Q 10/00 (2006.01)

(52) U.S. Cl. .................. 705/28; 705/7; 705/10

(58) Field of Classification Search ........... None
See application file for complete search history.

(56) References Cited

U.S. PATENT DOCUMENTS

| | | | |
|---|---|---|---|
| 5,299,115 A * | 3/1994 | Fields et al. | 705/10 |
| 5,765,143 A * | 6/1998 | Sheldon et al. | 705/28 |
| 6,076,064 A * | 6/2000 | Rose, Jr. | 705/1.1 |
| 6,453,298 B2 * | 9/2002 | Murakami et al. | 705/8 |
| 6,470,324 B1 * | 10/2002 | Brown et al. | 705/28 |
| 7,317,397 B2 * | 1/2008 | Gunsauley | 340/572.1 |
| 2002/0198761 A1 * | 12/2002 | Ryan et al. | 705/10 |
| 2005/0086070 A1 * | 4/2005 | Engelman | 705/1 |

* cited by examiner

*Primary Examiner*—F. Ryan Zeender
*Assistant Examiner*—Faris Almatrahi
(74) *Attorney, Agent, or Firm*—Dan Brown Law Office; Daniel R. Brown

(57) ABSTRACT

A method of providing a periodic vehicle order count recommendation for supplementing an inventory of a motor vehicle dealership to satisfy periodic market demand. The method includes the steps of converting a sales history database and an inventory database for the dealership into a dealership data structure, and obtaining from an agent of the dealership, query parameters including a specified sales history period, a forecast period, and a market region specification. The method also includes the steps of accessing a database of VIN numbers registered with a government agency, decoding VIN numbers registered within the market region, and storing resultant registered vehicle information into a regional vehicle registrations data structure. Then, estimating a periodic vehicle order count to satisfy market demand within the market region during the forecast period based on the dealer database structure of inventory and sales history over the specified sales history period, and the regional vehicle registration data structure.

9 Claims, 22 Drawing Sheets

VEHICLE INVENTORY MANAGEMENT SYSTEM AND METHOD

Applicant claims priority under 35 U.S.C. §120, and this application is a continuation of, co-pending U.S. patent application Ser. No. 11/368,736 filed on Mar. 6, 2006.

BACKGROUND OF THE INVENTION

1. Field of the Invention

The present invention relates to a dealer vehicle inventory ordering system. More specifically, the present invention relates to a computer and Internet implemented system and method for recommending what models and features of new and used vehicles should be periodically ordered by a dealer to meet periodic market demand.

2. Description of the Related Art

New and used vehicle automotive dealers are continually challenged to keep a sellable inventory of cars, trucks, and vans on their lots, while holding the costs of doing so to a bare minimum. The old sale axiom that "you can't sell what you don't have" is particularly applicable to automotive dealerships. Thus, a large inventory of a wide variety of vehicles increases the likelihood of having a vehicle that any particular customer may be willing to buy on any given day. However, the cost of maintaining a large inventory intended to satisfy the day to day demands of automotive customers quickly becomes prohibitive as the quantity of vehicles increases. More problematic is the situation where a dealer has vehicles in the inventory that nobody wants to buy.

Automotive dealers employ various financing strategies to cover the cost of maintaining an inventory of vehicles on their lots. This cost is typically referred to as the "floor plan" cost. Dealers may obtain floor plan financing from a new vehicle manufacturer, a bank, or other financial sources. The floor plan cost to the dealer increases as number and duration of vehicles remaining in inventory increases. Thus, every dealer has a strong preference to obtain only those vehicles that will sell quickly, thereby holding floor plan costs at comparatively low levels. Typically, dealers seek to turn all inventory within thirty days, some may tolerate forty-five or sixty days. In all cases, there comes a point in time when a vehicle is classified as "over-aged." When a vehicle becomes over-aged, the dealer will employ aggressive tactics to "move" the vehicle, such as sales incentives, brokered sales, or others. It is axiomatic that the best way to avoid over-aged inventory is to order only those vehicles models with options and colors that are likely to sell quickly.

It is a craft, and indeed an art, for a dealer to select and order new and used vehicles that will sell quickly, while still maintaining a sufficient inventory so as not to miss potential sales due to lack of inventory. Typically, dealers assess inventory levels and order additional vehicles on a weekly basis. With respect to new vehicle orders, the process is complicated by the fact that the dealer will not necessarily get every vehicle ordered due to certain manufacturer allocation processes. The dealer places an order, and then waits for an acknowledgement of inbound inventory from the manufacturer. Inbound inventory is further characterized by the expected arrival time at the dealership, typically aged as 60-days inbound; 30-days inbound; and so forth. Thus, the total number of vehicles available to a dealer includes the physical inventory on the lot and the inbound inventory expected over the subsequent 60-day period.

Motor vehicle dealerships manage a great deal of data with respect to the inventory of vehicles, sales transactions, parts, financing, staff, and so forth utilizing Reynolds & Reynolds (hereinafter "R&R"), ADP, and other Dealer Management Systems. The management processes are administered using computer based software applications, with two providers dominating the industry. These are R&R and ADP, both of which are familiar to those skilled in the art. R&R and ADP software both provide sales history database that can be accesses and analyzed by the dealer during the vehicle ordering process. Indeed, prior sales transactions made by the dealer are useful indicators as to what future sales might be. However, sales history does not necessarily predict seasonal and periodic changes in buying habits and trends in the market. Furthermore, the dealer's sales history database contains information only on sales by that particular dealer. Another resource available in the vehicle ordering process is the manufacturer's fast turn report. This report describes what vehicles are selling quickly, by model, color, preferred equipment group, and etc. While useful, fast turn reports are based on national or wide area zone level trends, and are based on vehicles allocated by the manufacturer.

Each dealership tasks a management individual or a team of individuals who are responsible for practicing the "craft" of predicting customer buying trends and desires, and who order vehicles to meet the expected need. They rely upon the sales history database, the manufacturer fast-turn reports, certain third party market barometers, and their gut-level instincts about what will sell in the near term. Thus, it can be appreciated that there is a need in the art for a system and method of predicting new and used vehicle sales trends useful for managing floor plan costs at the dealership level while reasonably insuring that market demands are met.

SUMMARY OF THE INVENTION

The need in the art is addressed by methods of the present invention. A method of determining a periodic vehicle order count for supplementing the inventory of a motor vehicle dealership to satisfy periodic market demand is taught. The method includes the steps of calculating a rate of vehicle sales based on a sales history from the dealership over a selected sales history period, and determining a periodic inventory requirement projection for a forecast period based on the rate of vehicles sales. The method further includes deducting the inventory of vehicles from the periodic inventory requirement projection to yield a supplemental inventory requirement projection, and incorporating vehicle consumption data derived from a selected market area into the supplemental inventory requirement projection, thereby resulting in the periodic vehicle order count.

In a specific embodiment of the method, the selected sales history period includes a recent sales history portion and a periodic sales history portion. In another embodiment, the inventory of motor vehicles includes a current inventory portion and an inbound inventory portion. The inbound inventory portion may be organized by expected time before availability for sale by the dealership. In another specific embodiment, the periodic vehicle order count is denominated by make, model, preferred equipment group, options, color etc. In another embodiment, the forecast period is a dealer's days-supply inventory requirement. In a refinement to this embodiment, the method includes the further step of creating an over-aged vehicle report comprised of vehicles that have been in the inventory longer than the dealer's days-supply inventory requirement period.

In another specific embodiment of the foregoing method, the selected market area is specified by county names, ZIP codes, or geographic coordinates. IN another embodiment, the vehicle consumption data is derived from the sales history of plural other vehicle dealerships located within the selected market region. In another embodiment, the vehicle consumption data is derived from VIN numbers registered in the selected market area. In a refinement to this embodiment, the VIN numbers are decoded to make, model, options, equipment packages, colors etc. In another embodiment, the method includes the further step of incorporating a manufacturer fast-turn vehicle report into the supplemental inventory requirement to result in the periodic vehicle order count. In another embodiment, the inventory and the periodic vehicle order count include used vehicles. In yet another embodiment, the foregoing method includes the further step of placing an order by the dealer for supplemental inventory from a vehicle supplier based on the periodic vehicle order count.

The present invention also teaches a method of providing a periodic vehicle order count recommendation for supplementing an inventory of a motor vehicle dealership to satisfy periodic market demand. The method includes the steps of converting a sales history database and an inventory database for the dealership into a dealership data structure, and obtaining from an agent of the dealership, query parameters including a specified sales history period, a forecast period, and a market region specification. The method also includes the steps of accessing a database of VIN numbers registered with a government agency, decoding VIN numbers registered within the market region, and storing resultant registered vehicle information into a regional vehicle registrations data structure. Then, estimating a periodic vehicle order count to satisfy market demand within the market region during the forecast period based on the dealer database structure of inventory and sales history over the specified sales history period, and the regional vehicle registration data structure.

In a specific embodiment of the foregoing method, the specified sales history period includes a recent sales history portion and a periodic sales history portion. In another embodiment, the inventory database includes a current inventory portion and an inbound inventory portion. The inbound inventory portion may be organized by expected time before availability for sale by the dealership. In addition, the inbound inventory portion may be provided by a vehicle manufacturer. In another embodiment, the periodic vehicle order count is denominated by make, model, preferred equipment group, options, color etc. The market region specification may be specified by county names, ZIP codes, or geographic coordinates.

In a specific embodiment of the foregoing method, the regional vehicle registration data structure includes data fields for makes, models, options, equipment packages, colors etc. In another embodiment, the method includes the further step of converting a vehicle manufacturer fast-turn vehicle report into the dealership data structure. In another embodiment, the sales history database, the inventory database, and the periodic vehicle order count include used vehicles. In a specific embodiment of the foregoing method, the database of VIN numbers is provided by R.L. Polk & Co. or other similar source. In yet another embodiment, the method includes the further step of creating an over-aged vehicle data structure of current inventory that has been in the inventory longer than the forecast period. In a further refinement, the method includes the step of accessing the over-aged vehicle data structure by a vehicle broker.

In a specific embodiment of the foregoing method the converting and the estimating steps are executed on a server-computer. The method will include the further step of accessing the server-computer through the Internet. In a further refinement, the method includes the further step of performing a logon and user access validation process prior to enabling the access step. In yet another refinement, the method includes the further step of charging a user fee for access to the periodic vehicle order count. In a specific embodiment of the foregoing method, the dealership data structure is comprised of data for plural motor vehicle dealerships.

DESCRIPTION OF THE INVENTION

Figure 1:
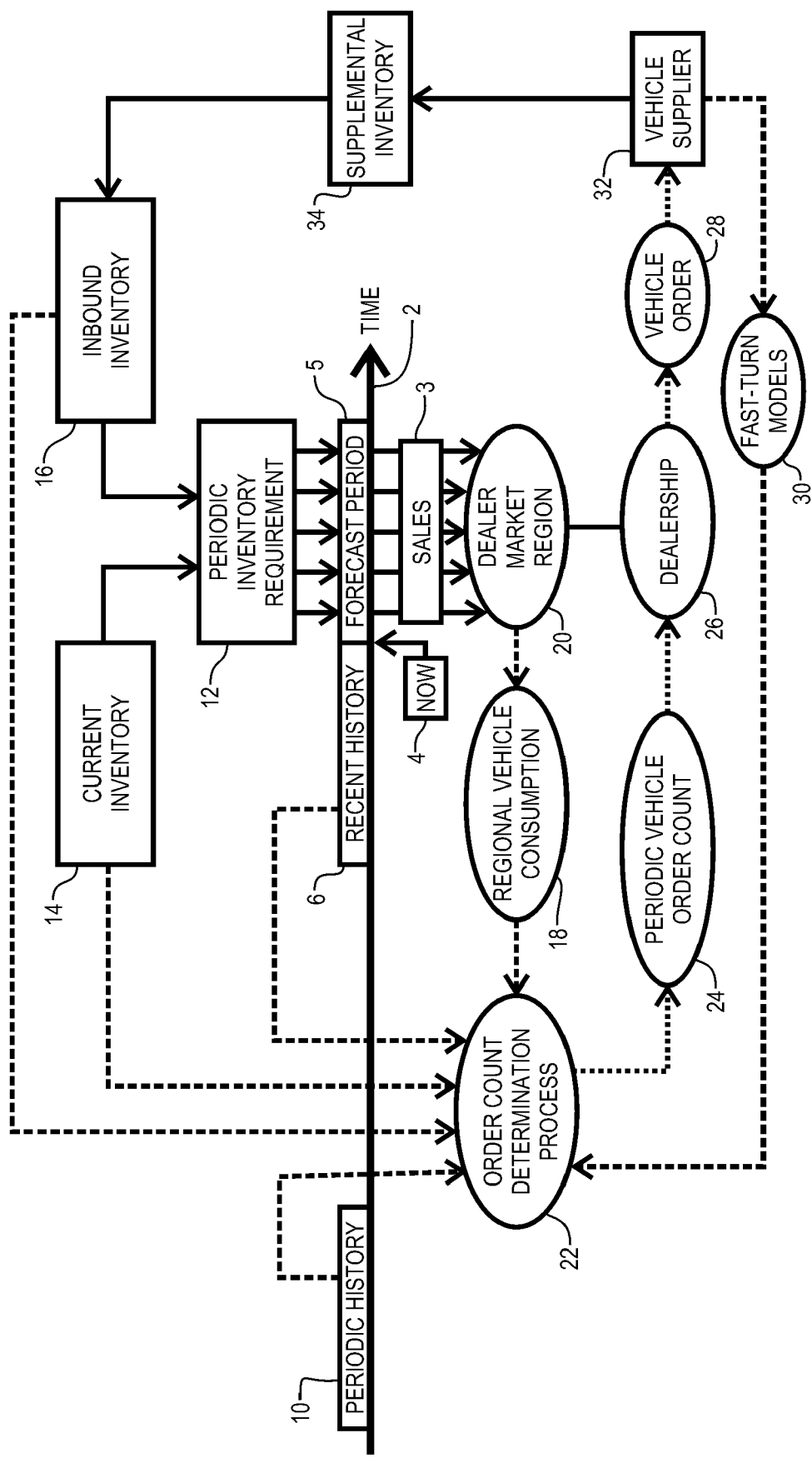
FIG. 1 is a system function and timeline diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention advances the art using a method of producing a periodic vehicle order count for a motor vehicle dealership, which is based on information about the dealership's sales history, current and inbound inventory, and regional vehicle consumption information, which can be derived from the sales history of other dealerships located on the local market region, or from vehicle registration data within that region. The order count report is directed to a dealer-specified forecast period, and itemizes the recommended order by vehicle model, equipment packages, options, colors etc. Even though the forecasting approach employed in the present invention is superior to prior art techniques, it remains a "recommended" order count, which the dealership is free to amend prior to actually placing an order from a manufacturer or used vehicle supplier. Both new and used vehicle market requirements are addressed. In addition, the method tracks the dealership inventory of over-aged vehicles, and outputs a data structure that can be accessed by third parties, such as vehicle brokers, who can assist the dealership in "moving" over-aged inventory. In an illustrative embodiment, the method is embodied on a computer server, which is accessed through the Internet. The computer server can support multiple dealerships, with each dealership's data being protected through a login and access validation security process. The gathering of dealership data, determination of the recommended order count, and other functions, are offered as a value-added service to dealerships, which may be made available as a subscription service. The over-aged vehicle data can likewise be provided as a value-added service to brokers or other dealerships interested in locating particular vehicles.

As a practical matter, dealers have invariably overstocked their new and used vehicle sales lots, and have sought assistance in determining vehicle order counts. Vehicle order counts typically include model number, preferred equipment package specification, and color, which are tracked by an ordering and inventory software application, such as Reynolds & Reynolds, ADP, or others. Dealerships place orders and keep an inventory of new passenger cars and trucks based on a desired number of days supply for a forecast period. This period is sometimes referred to as the "days-supply" period. Generally, a dealership places weekly orders with their manufacturers. The manufacturer provides, by dealership, an order acknowledgement on all orders placed by the dealership on a daily basis, which is entered into the R&R, ADP, or other systems. This information includes the order date, order number, status code, and the vehicle information, including model numbers, preferred equipment packages, color and options. Thus, the dealership's information system, through the R&R, ADP, or other software, tracks both the current inventory and the manufacturer inbound inventory on a weekly and daily basis. As vehicles are sold to customers, their status is transferred by the dealership from "inventory" to sales history; again, this is accomplished with the R&R, ADP, or other software.

Reference is directed to FIG. 1, which is a system function and timeline diagram according to an illustrative embodiment of the present invention. The passage of time is indicated by horizontal line 2 with arrow, where the present time is indicated as "NOW" 4. The present time 4 is the day a dealership 26 evaluates periodic inventory requirements 12 to meet market demand during a forecast period 5. The dealership's goal is to make vehicles sales 3 during a forecast period 5, which is typically the days-supply period. Sales 3 are made into the dealer's market region 20 from the dealership's inventory 12. Since the actual inventory changes on a daily basis as new "inbound" vehicles arrive and current inventory 14 is sold, the inventory available during the forecast period 5 is referred to as the periodic inventory requirement 12. It may also be referenced simply as the periodic inventory 12. The periodic inventory 12 comes from the current inventory 14 and the inbound inventory 16. Current inventory 14 is measured at the time (e.g. NOW 4) when supplemental inventory 34 is ordered from a vehicle supplier 32, which may be new or used vehicles. Thus, the periodic inventory 12 is drawn from current inventory 14 and inbound inventory 16, which is supplemented by supplemental inventory 34 during the forecast period 5. The supplemental inventory 34 results from a vehicle order 28 placed by the dealership 26 in response to a periodic vehicle order count 24 provided by the methods of the illustrative embodiment of the present invention.

Continuing in FIG. 1, the illustrative embodiment of the present invention utilizes an order count determination process 22 to produce a recommended periodic vehicle order count 24, which is communicated to the dealership 26. The dealership uses the recommendation 24 to formulate a vehicle order 28, which is forwarded to a vehicle supplier 32. As a dealership gains confidence in the periodic vehicle order count 24, through repetitive use of the recommendation, the actual vehicle order 28 may indeed coincide with the recommendation 24. The order count determination process 22 gathers input data from the dealership's current inventory 14, inbound inventory 16, as well as sales history parameters provided at the dealership's discretion. The sales history parameters may include a recent history period 6 and a periodic history period 10. Since the sales history data is particular to the dealership's actual sales, it does not reflect all market trends in the dealer's 26 market region 20. For this reason, the present invention advantageously uses vehicle consumption data 18 from within the dealer's market region 20 to adjust the vehicle order count determination process 22. Consumption data 18 is derived from either vehicle registration reports in the local region, or from data reports gleaned from sales made by other dealerships located within the dealer's market region. Another influence in the vehicle order count determination process 22 is a fast-turn model report 30 that may be provided from the manufacturer 32 from time to time. Using this influence, the dealership 26 is more likely to obtain a suitable number of "hot" products coming into the market.

With respect to the recent history data 6 and the periodic history data 10, the illustrative embodiment of the present invention enables the dealership to specify these ranges of data in a number of creative ways. In a typical application, the dealership may desire the most recent sales 6 influence needs for the upcoming forecast period 5. For example, the dealer may specify that the most recent two months of vehicle sales data be entered into the determination process 22. However, recent sales history can miss seasonal trends in vehicle sales. For example, convertible cars sell more frequently during warmer weather, so winter sales data may underestimate spring sale demand. By enabling the use of data from periodic sales, such as the last three years of springtime sales, the determination process 22 more accurately predicts future sales for the upcoming forecast period 3. The dealership 26 selects the dates and duration of the history periods 6, 10 based on the forecast period 5 and prior experience using the determination process 22. In addition to the sales history parameters, the dealership provides a definition of the market region 20 as an input to the determination process 22. The market region 20 is the area in which the dealerships customers live. It can be defined by a listing of states and counties, a listing of ZIP code areas, or other geographic parameters, such as metes and bounds of latitude and longitude.

Figure 2:
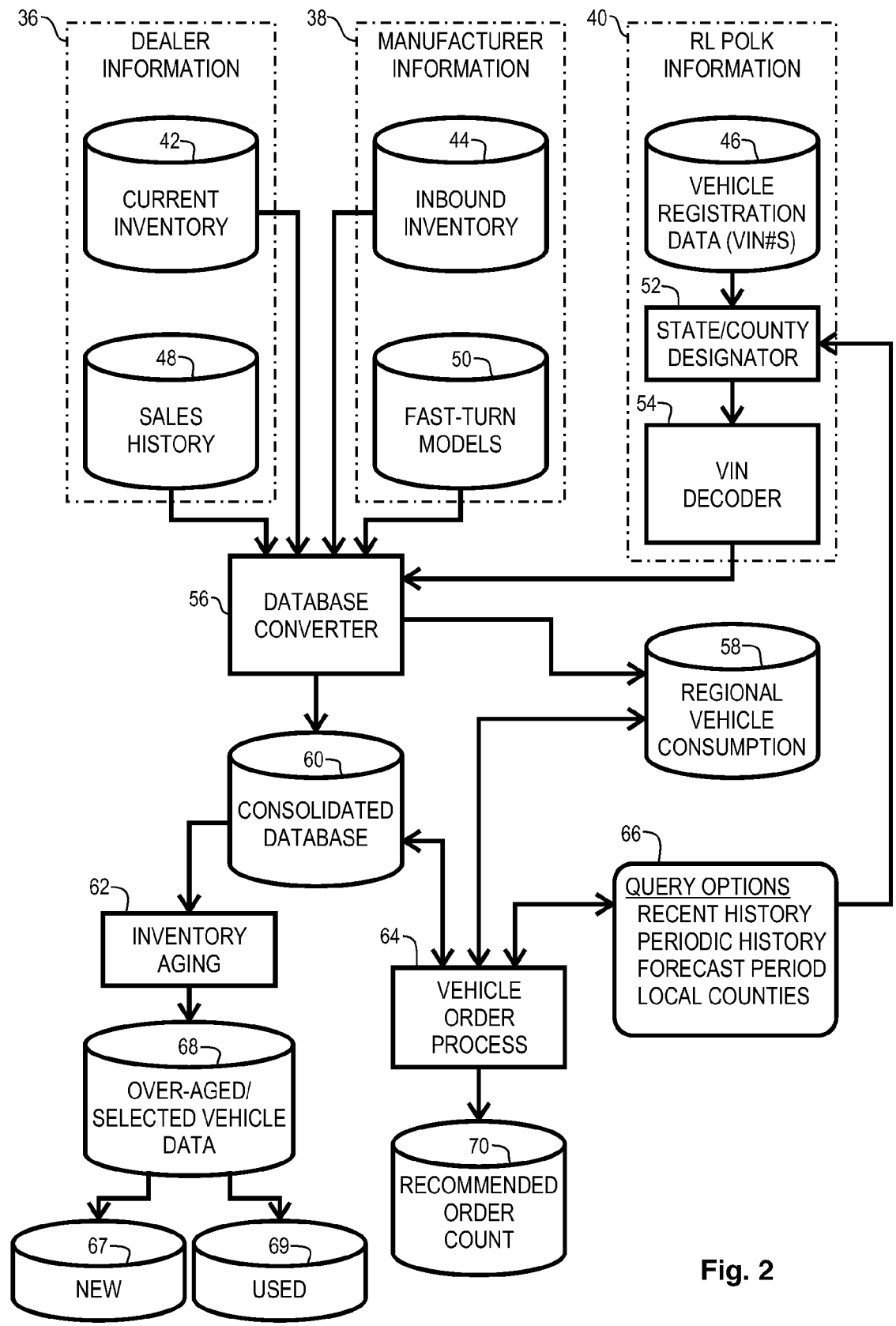
FIG. 2 is a data storage, transfer and processing diagram according to an illustrative embodiment of the present invention.

Reference is directed to FIG. 2, which is a data storage, transfer and processing diagram according to an illustrative embodiment of the present invention. In this embodiment of the present invention, the various data inputs and outputs are arranged into data structures, which can be accessed using conventional standard query language ("SQL") commands, understood by those skilled in the art. The source data comes from three kinds of sources, as well as from query options 66 provided by the dealer. One of the three kinds of sources is dealer information 36, which resides on the dealership's information management system, typical of the R&R, ADP, and other similar systems. This data includes the current inventory data structure 42 and the sales history data structure 48. Another kind of information is the manufacturer information 38, which includes an inbound inventory data structure 44 and a fast-turn model data structure 50. Note that in some embodiments, the manufacturer information 38 is first transferred to the dealership information system 36, and is then passed to the processes of the present invention. The arrangement is a design choice. The third kind of information is the vehicle consumption data, which may provided through R.L. Polk & Co. ("RL Polk") 40 or other providers. Two other providers include Expedient.net and Cross-sell.com, who provide regional vehicle sales information that is gleaned from other vehicle dealerships locating in the local region.

The R.L. Polk & Co. scours state and local government agencies to gather vehicle registration information, which includes the VIN number, the name and address of the registered vehicle, and certain information about the vehicle. The information is stored in a data structure 46 by RL Polk 40. One of the query options 66 provided by the dealership is the geographic description of the dealer's local market region, which is the state and county names in the illustrative embodiment. The local market region specification is passed to the state & county designator 52, which selects the pertinent VIN registration data, including a listing of VIN numbers registered during a selected period, typically provided on a monthly basis. The VIN number and related data are passed to a VIN number decoder 54, which is another data service provided by RL Polk 40. The VIN number decoder outputs an array of data for the VIN numbers that have been decoded. All of the data from the dealer information 36, manufacturer information 38 and RL Polk 40 are passed through a database converter 56 of the present invention. The database converter 56 reformats and structures the various data to be compliant with a consolidated dealership data structure 60, which addresses the requirements of the illustrative embodiment database and SQL engine operating within a server computer, dubbed with the trade name "Mirror The Market Inventory", or "MTMI" system. Note that in the illustrative embodiment, the vehicle registration data is stored in a dedicated regional vehicle consumption data structure 58. The reason for the separation is that this information may be pertinent to more than one dealership. Also note that the consolidated data structure 60 contains data structures for many dealerships, which enables the viability of the business model of the present invention. The business model is to provide the periodic vehicle order count forecast to many dealerships on a recurring basis as a subscription service.

Continuing in FIG. 2, the consolidated dealership data structure 60 includes the inventory, sales history and other data, which is indexed by dealership. This data structure is queried using SQL commands by the vehicle order estimating process 64 and the inventory aging process 62, both using the dealership provided query options 66. The vehicle order process outputs a recommended periodic vehicle order count data structure 70, which is provided as a report to the dealership periodically, usually on a weekly basis. Similarly, the inventory aging process 62 outputs an over-aged vehicle data structure 68 that can be accessed by the dealership and by brokers who subscribe to the service and who assist the dealerships in disposing of aver-aged vehicles. In addition to providing over-aged vehicle information, a dealer can selectively add and delete vehicles from this data structure as deemed to meet market and sales needs. Accordingly, the data structure 68 is referred to as the over-aged and selected vehicle data structure. Access to the over-aged/selected vehicle structure is different depending on whether new or used vehicles are at issue. Therefore, the database offers both a NEW vehicle over-aged data structure 67 and a USED vehicle over-aged data structure 69. The query option 66 includes the recent history time frames, the periodic history time frames, the forecast period time frames, the local market region specification, and other parameters depending on the embodiment involved. Note that all of the data structures and processes support both new vehicle and used vehicle transactions.

Figure 3:
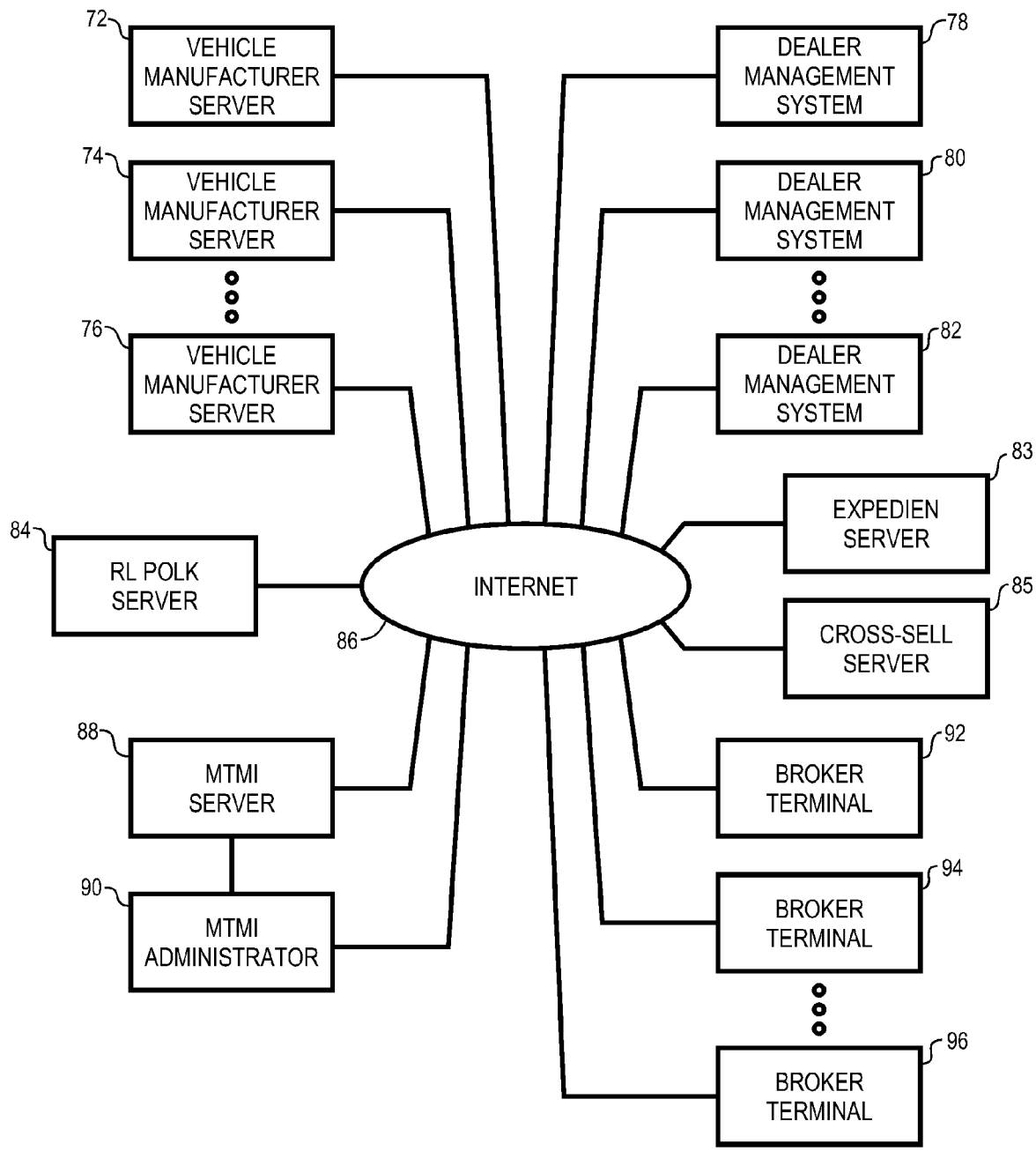
FIG. 3 is a communication interconnection diagram according to an illustrative embodiment of the present invention.

Reference is directed to FIG. 3, which is a communication interconnection diagram according to an illustrative embodiment of the present invention. The systems, methods, and processes of the present invention can be carried out in various configurations ranging from execution on a single machine at a single location to a widely distributed system operating on a wide area network. In the illustrative embodiment of FIG. 3, the Internet 86 is employed to interconnect the system of the present invention with those who contribute to and access service there from. As noted herein before, the MTMI server 88 stores the data structures and executes the processes of the present invention. An MTMI administrator function 90 is coupled to the MTMI server 88 either directly or remotely via Internet 86 connection. RL Polk operates its own server 84 at its facilities, which may be accessed through the Internet 86 in the future, thereby enabling access thereto by the MTMI server 88. Currently RL Polk will provide MTMI a file containing registration information. Two other sources for regional vehicle consumption information are the Expedien server 83 and the Cross-Sell server 85. Expedien™ 83 is a service provided by Scarlet Infotech, Inc., Houston, Tex., which provides vehicle consumption data that is gathered from plural vehicle dealerships, and which is reported in a variety of ways, including targeted local regional markets. Cross-Sell™ 85 is a similar service provided by Cross-Sell, Inc., Louisville, Ky. Plural vehicle manufacturers 72, 74, 76 each operate their individual manufacturer servers, which may also be accessible via the Internet 86 in the future. Plural vehicle dealerships operate their respective dealer management systems 78, 80, 82, all so which are coupled through the Internet 86. Similarly, plural vehicle brokers employ terminals 92, 94, 96 that are also coupled through the Internet 86. Note that any number of manufacturers, dealers, brokers and administrator access points can be supported using the teachings of the present invention.

Figure 4:
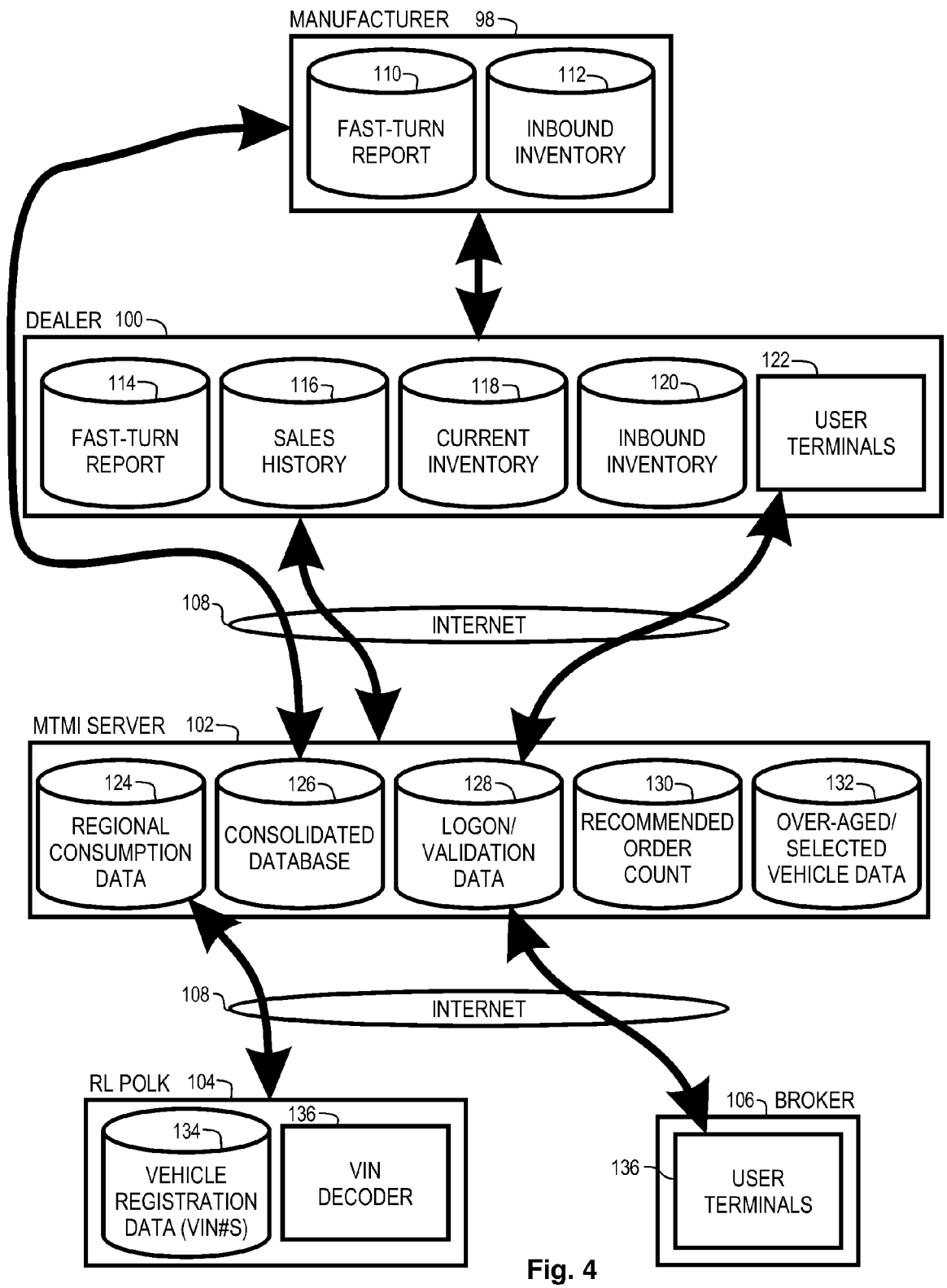
FIG. 4 is a data processing diagram according to an illustrative embodiment of the present invention.

Reference is directed to FIG. 4, which is a data processing diagram according to an illustrative embodiment of the present invention. The embodiment divides the data structures and processes between the manufacturer 98, the dealership 100, the MTMI server 102, the RL Polk facilities 104 and a broker's 106 terminal 136. The manufacturer may 98 provide the faster-turn vehicle report data 110 and inbound inventory data 112 to the dealership 100, using means that are agreed upon by those entities. The manufacturer 98 can also provide the fast turn report 110 and inbound inventory report 112 directly to the MTMI server 102. When the dealer places an order for vehicles from the manufacturer, there is no guarantee that the dealer will get exactly what was ordered. There are manufacturing and allocation issues that are beyond the control of the dealer, and beyond the scope of this discussion. What is significant is that the manufacturer 98 provides an inbound inventory report 112, which lists the vehicles and their respective status, including expected delivery date. One example of this information provides status as 60-days inbound (60INB), 30-days inbound (30INB), built (BUILT), and in-stock (INSTK). This status information is useful to the dealership and to the MTMI server processes in estimating future order recommendations, given the flowing, or rolling nature of vehicle inventory management.

In FIG. 4, the dealership 100 management system, such as R&R or ADP, contains the data base information including the current inventory 118, the inbound inventory 120, the sales history 116, and the fast-turn vehicle report 114. All of these databases are updated from time to time during routine business operations of the dealership. The dealer system, 100 also includes one or more user access computer terminals 122. The databases and the user terminals 122 are coupled via the Internet 108 to the MTMI server 102 in the illustrative embodiment. The dealer user terminals 122 are coupled to a login and validation process 128 in the MTMI server, which guards access and security of the system data and processes. A system of log-in user names and passwords is employed in the illustrative embodiment. Data is transferred between the dealer 100 and the MTMI server 102 via an Internet 108 connection. The dealer oriented data structures in the MTMI server include the over-aged/selected vehicle data base and report 132, the periodically produced dealer vehicle order count report 130, and the consolidated data structure of dealership data.

The RL Polk facilities 104 are also connected to the MTMI server 102 via the Internet 108 in FIG. 4. This includes the vehicle registration database 134 and the VIN decoder utility 136. The regional registration data received from RL Polk 104 is coupled to the regional consumption data structure 124 in the MTMI server system 102. Finally, the broker 10 access terminals 136 are coupled via the Internet 108 to the log-in and validation processes 128 of the MTMI server 102.

Figure 5:
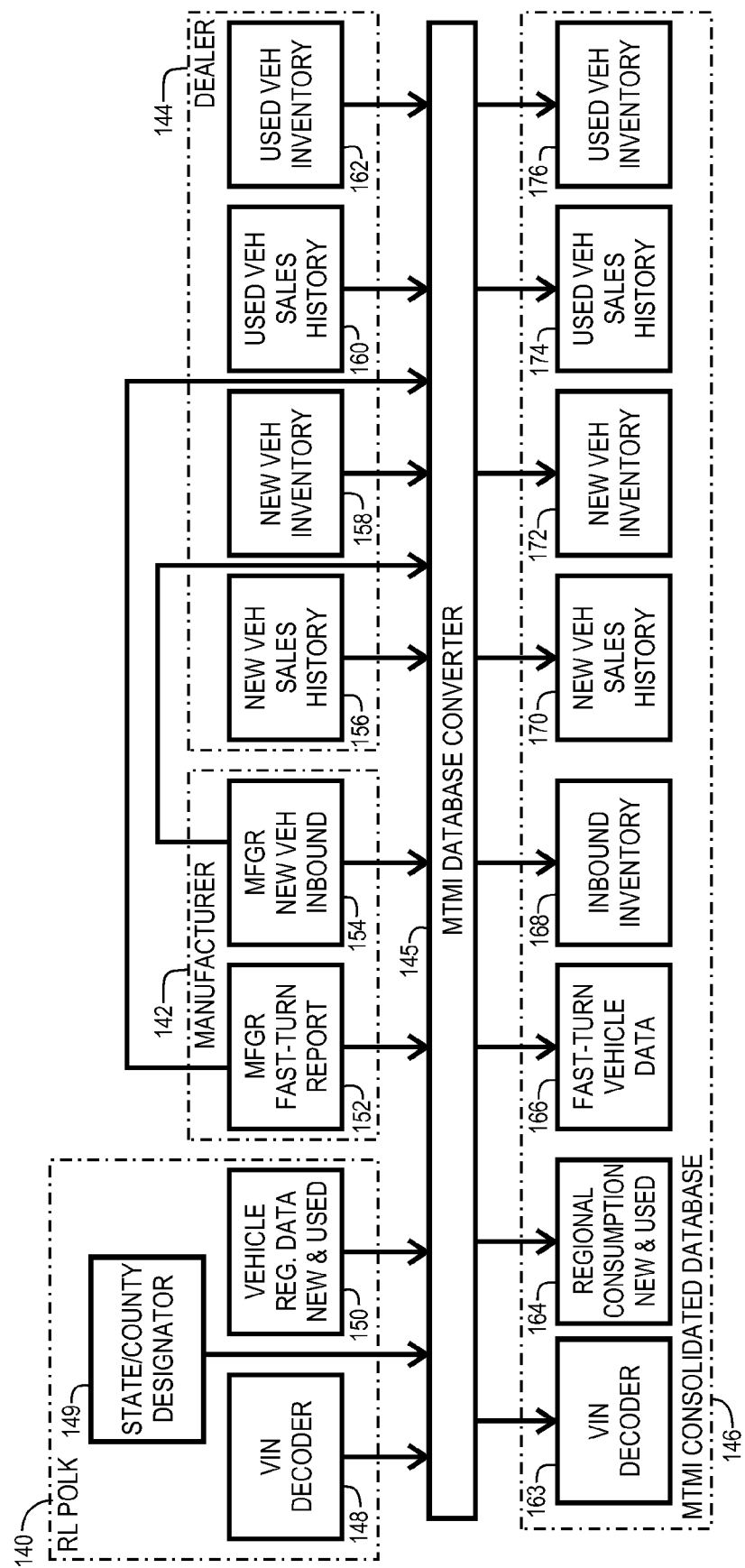
FIG. 5 is a database converter and generator diagram according to an illustrative embodiment of the present invention.

Reference is directed to FIG. 5, which is a database converter and data structure generator diagram according to an illustrative embodiment of the present invention. The MTMI database converter 145 functions to translate the databases from various manufacturers, dealerships, and other data sources into a uniform, SQL compliant, format for access by the MTMI processes and MTMI customers, including dealerships and brokers. The data sources include RL Polk 140, vehicle manufacturers 142, and dealers 144 in the illustrative embodiment. The MTMI database converter 145 runs within the MTMI server and communicates data into the MTMI consolidated data structure 146. RL Polk 140 provides the vehicle registration data 150, which is gleaned from governmental agencies, and the VIN decoder process 148. The selection of specific, geographically associated VIN information is accomplished using the state and county designator 149 to selectively provide VIN decoding 148 of data pertinent to a given dealer's 144 geographic region. The MTMI database converter translates this data into the new and used vehicle regional vehicle consumption data structure 164, and also into an MTMI compliant VIN decoder data structure 163. The vehicle manufacturers 142 provide new vehicle inbound inventory 154 and fast-turn vehicle 152 reports. Note that the manufacturer data 142 may couple directly to the MTMI database converter 145 or may be conveyed through the dealer's system 144. In either case, the data is translated by the MTMI database converter 145 into the fast-turn vehicle data structure portion 166 and inbound inventory portion 168 of the MTMI consolidated database 146. The dealerships 144 provide the new vehicle sales history data 156, the new vehicle inventory data 158, the used vehicle sales history 160, and the used vehicle inventory data to the MTMI database converter 145. This data is translated into the new vehicle sales history data portion 170, the new vehicle inventory data portion 172, the used vehicle sales history portion 174, and the used vehicle inventory data portion 176 of the MTMI consolidated data structure 146.

With regard to the routine transfer and file updates, a downloaded file for a dealership, which contains all data, on the file, for a single dealership, is read by the dealerships maintenance file program in the MTMI server. Note that only one vehicle order number record exists per vehicle. This record is used to update the MTMI dealer database for that vehicle. If the record does not exist by order number in the dealer file, a new record is created and added with a current system add date. If the record currently exists on the dealer file, a check is made to verify changes. If there are no changes, the record is left untouched. If changes exist, such as a change in the inbound inventory status code, the dealer file is updated and a last change date is reset. When the manufacturer has accepted an order, it then assigns a serial number, which becomes part of the dealer's file and a part of the record access. Generally, a new file update for each dealership is sent on a weekly basis. An additional program is run that merges the updated information file with the dealer's current file. On a weekly basis, each dealer runs the projection process 190 against the latest updated inventory file and sales history file, which generates the inventory requirement projection by model, preferred equipment, options and color. This is the recommendation for orders to be placed for that week.

Figure 6:
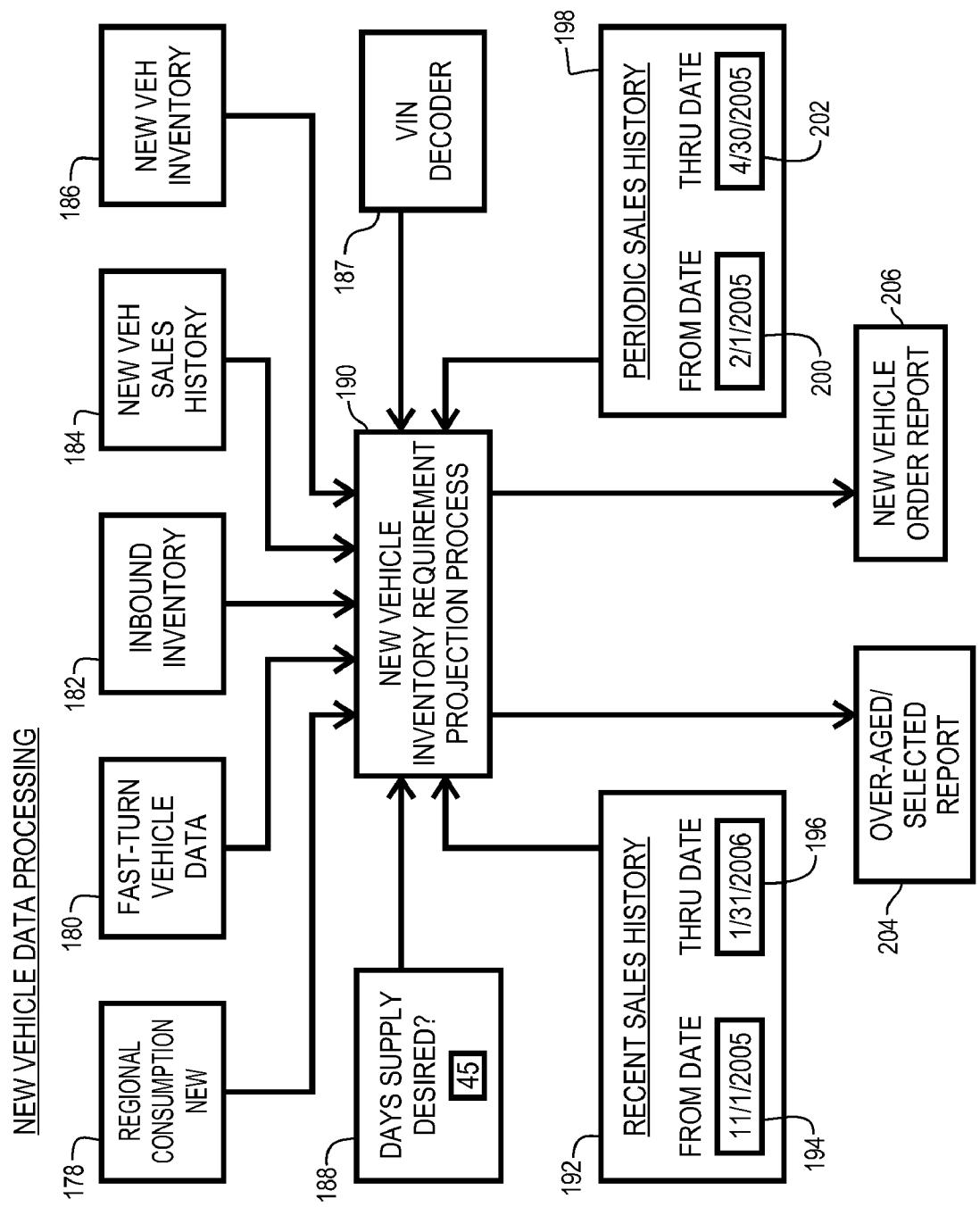
FIG. 6 is a new vehicle data processing diagram according to an illustrative embodiment of the present invention.

Reference is directed to FIG. 6, which is a new vehicle data processing diagram according to an illustrative embodiment of the present invention. The new vehicle inventory requirement projection process 190 produces the periodic new vehicle order count 206 report, which is communicated to the dealer. The process 190 relies upon input from the regional consumption data structure 178, the fast-turn vehicle data structure portion 180, the inbound inventory portion 182, the new vehicle sales history portion 184, the VIN decoder 187 data, and the new vehicle current inventory portion 186 of the consolidated data structure on the MTMI server. In addition the dealer query information is needed, which may be adapted for each forecast period. This includes the desired days-supply 188 of the forecast period, the recent sales history date range 192, including the "from date" 194 to the "thru date" 196, and the periodic sales history date range 198, including the "from date" 200 and the "thru date" 202 range. In addition, the number of periods for the periodic query is input (not shown). The projection process 190 produces both the periodic new vehicle order count 206 for the forecast period, and also the over-aged/selected vehicle report 204, which includes all new vehicles that have been in current inventory longer than the days-supply duration.

The process of producing the periodic new vehicle order count 206 within the process 190 involves several steps, some of which have been discussed herein before. In the exemplary illustrative embodiment, the days-supply inventory needs are calculated using previous months and years sales history of a particular dealership utilizing the R&R or ADP information. The dealer can vary history time requirements as it deems fit to meet their market perspectives. The dealer has the ability to request date parameters using both previous months and previous years, including the number of years, as well as number of months used in previous years. The sales history is used to determine the average number of vehicles sold by day on a model-by-model basis. The dealer also specifies its desired days supply by allocated model group. A formula including the dealer's current inventory and inbound orders is then used to calculate the desired number of vehicles that are recommended for order for the current week. The results are cross-referenced to the information provided by the manufacturer's fast-turn report and registration information provided by RL Polk or similar company. This calculation provides the dealer with a recommended order count by model, preferred equipment group, option, and color within each allocation group. The RL Polk data may be used to provide ratios of model features, such as two wheel drive versus four wheel drive vehicles, which indicates the market ratio for such models. The determined ratios are then used to adjust the recommended vehicle order count to suit market trends.

In a specific embodiment of the process 190 in FIG. 6, the program totals all vehicles sold (by model, preferred equipment group, options, and color during the time periods specified. The total is divided by the number of days in the history period to produce an average number of vehicles sold per day. A count of total inventory, current and inbound, is performed. This total is then divided by the average sold per day to yield a number of days supply. The days supply number is then subtracted from the dealer's count of the number of days inventory required and the difference, provided it is a positive number, is multiplied by the average number of vehicles sold per day to determine the count to be ordered for that model, preferred equipment group, options, and color. This procedure repeated for every model configuration indicated by the dealership through its inventory database.

Figure 7:
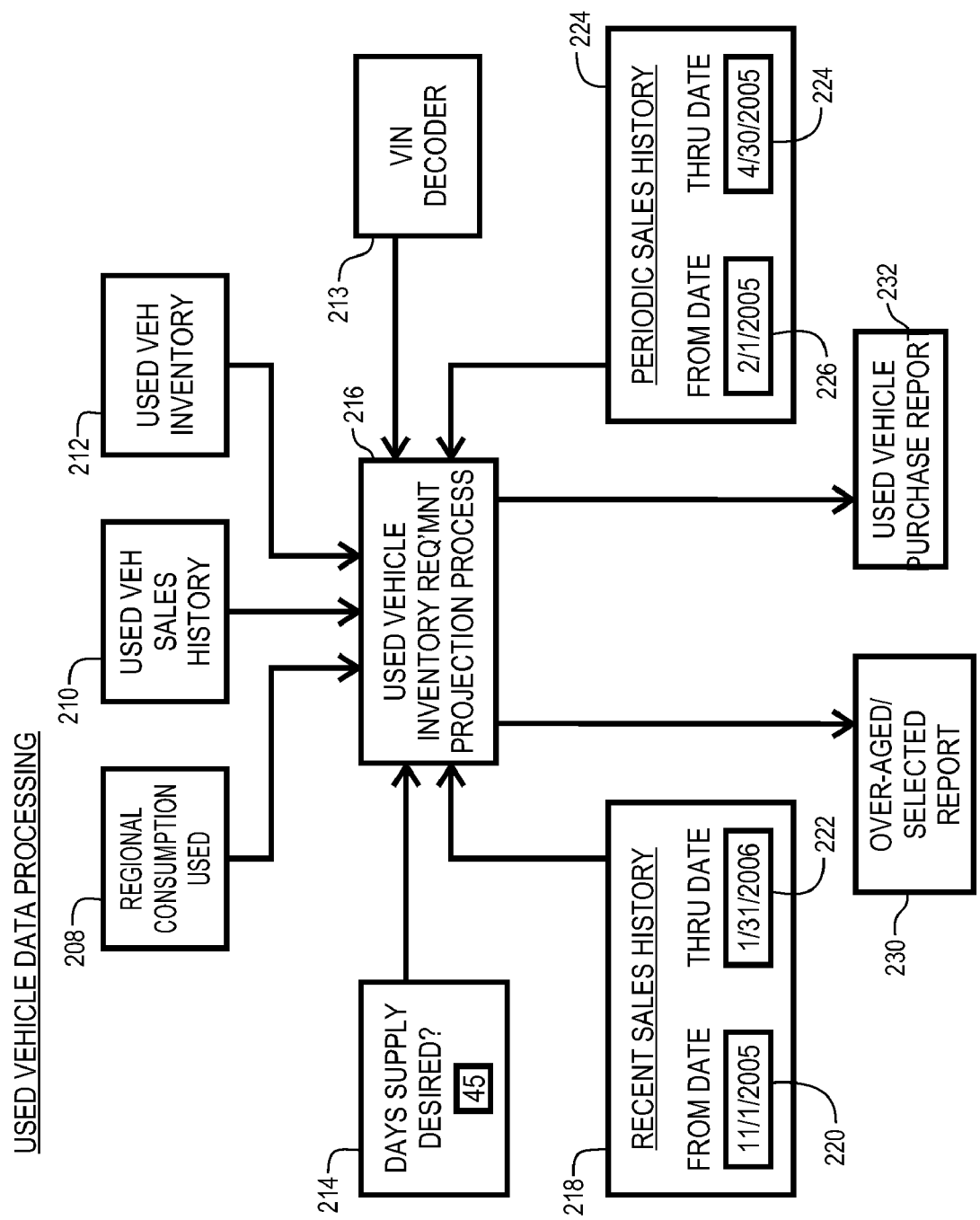
FIG. 7 is a used vehicle data processing diagram according to an illustrative embodiment of the present invention.

Reference is directed to FIG. 7, which is a used vehicle data processing diagram according to an illustrative embodiment of the present invention. The used vehicle inventory requirement projection process 216 produces the periodic used vehicle order count 232 report, which is communicated to the dealer. The process 216 relies upon input from the regional consumption data structure 208, the used vehicle sales history portion 210, the VIN decoder data 213, and the used vehicle current inventory portion 212 of the consolidated data structure on the MTMI server. In addition the dealer query information is needed, which may be adapted for each forecast period. This includes the desired days-supply 214 of the forecast period, the recent sales history date range 218, including the "from date" 220 to the "thru date" 222, and the periodic sales history date range 224, including the "from date" 226 and the "thru date" 224 range. In addition, the number of periods for the periodic query is input (not shown). The projection process 216 produces both the periodic used vehicle order count 232 for the forecast period, and also the over-aged/selected vehicle report 230, which includes all used vehicles that have been in current inventory longer than the days-supply duration.

The process of maintaining an inventory of used vehicles is similar to that for new vehicles, yet differs in significant ways. Dealerships invariably have used vehicles on their lots that sit for longer periods of time than others. Maintenance of a sellable inventory of used vehicles benefits from assistance in determining which vehicle models to buy at auctions or through dealer-to-dealer purchases. The dealer can determine an inventory of vehicles based on a desired days supply, similar to the case for new vehicles. Days supply requirement is determined using previous months and previous years sales history, again using the R&R or ADP vehicle management system data. Dealerships can vary history time requirements as they see fit. They can also specify date parameters using both previous months and previous years, including the number of years, as well as number of months used in previous years. The used vehicle sales history is used to determine the number of vehicle model segments sold by day. The dealer then determines their desired days supply. The formula includes the dealer's current inventory and the registration information provided by RL Polk, which is used to provide the dealer with a recommended vehicle order count by model segment with the top selling vehicles listed for the dealer's local geographic region. The process also provides a separate file 230 for vehicles that are over-aged and are available for purchase from other dealer's or brokers.

With respect to the operation of the used vehicle demand projection process 216 in FIG. 7, on a weekly basis, the dealer runs the program against the latest updated inventory and sales history files, which will give recommendations by model segment for vehicle to purchase that week. The process gives the dealer the opportunity of establishing parameters for sales history to be used to determine average count of vehicles sold by day. When the dealer is satisfied with the variables, execution of the program will be requested. The process totals vehicles sold by model segment during the time periods specified ('T1'). The total time is divided by the number of days in the period ('Nd') to get average number sold per day (Dsr'). The number sold per day is then multiplied by the desired number days supply ('Dns') to determine the total inventory for the forecast period (T2'). The current inventory ('Ci') is subtracted from the total number (T2') to determine the number of vehicles per model segment to purchase (N2p). The process of the illustrative embodiment is characterized as follows:

$$T1/Nd = Dsr \quad \text{Equation 1}$$

$$Dsr*Dns = T2 \quad \text{Equation 2}$$

$$T2 - Ci = N2p \quad \text{Equation 3}$$

Figure 8:
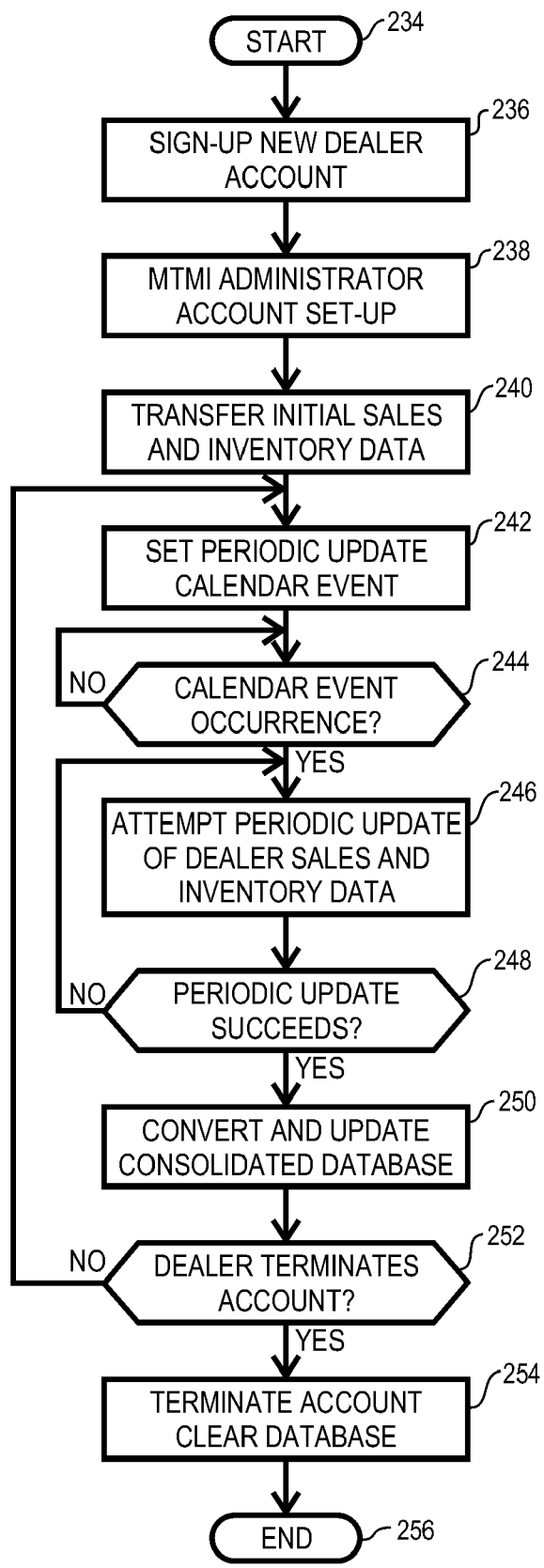
FIG. 8 is a dealer interface process diagram according to an illustrative embodiment of the present invention.

Reference is direct to FIG. 8, which is a dealer interface process diagram according to an illustrative embodiment of the present invention. FIG. 8 illustrates the process of setting up a dealer account and related processes. The process starts and step 234 and proceeds to step 236 where a new dealership account is initially set up. This includes gathering the pertinent information about the dealership and establishing the business relationship. At step 238, The MTMI administrator sets up the new account in the MTMI server, including establishment of an access username and password, as well as setting up the database transfer parameters. At step 240, the initial transfer of the dealer's sales and inventory information is completed. At step 242, a periodic calendar event is established to process the periodic updating and processing events. In the illustrative embodiment this is done on a weekly basis. At step 244, a calendar event date is reach, and at step 246, an attempt to transfer the current sales and inventory data is attempted. If the attempt fails at step 248, flow reverts to step 246 to try again. On the other hand, at step 248, is the update succeeds, then flow proceeds to step 250. At step 250, the database data is converted and the forecasting processes are run. If the dealer terminates their account at step 252, that action is performed at step 254 and the login access is terminated. On the other hand, at step 252, is the account is not terminated, flow returns to step 242 where the periodic calendar event repeats. The process terminates at step 256.

Figure 9:
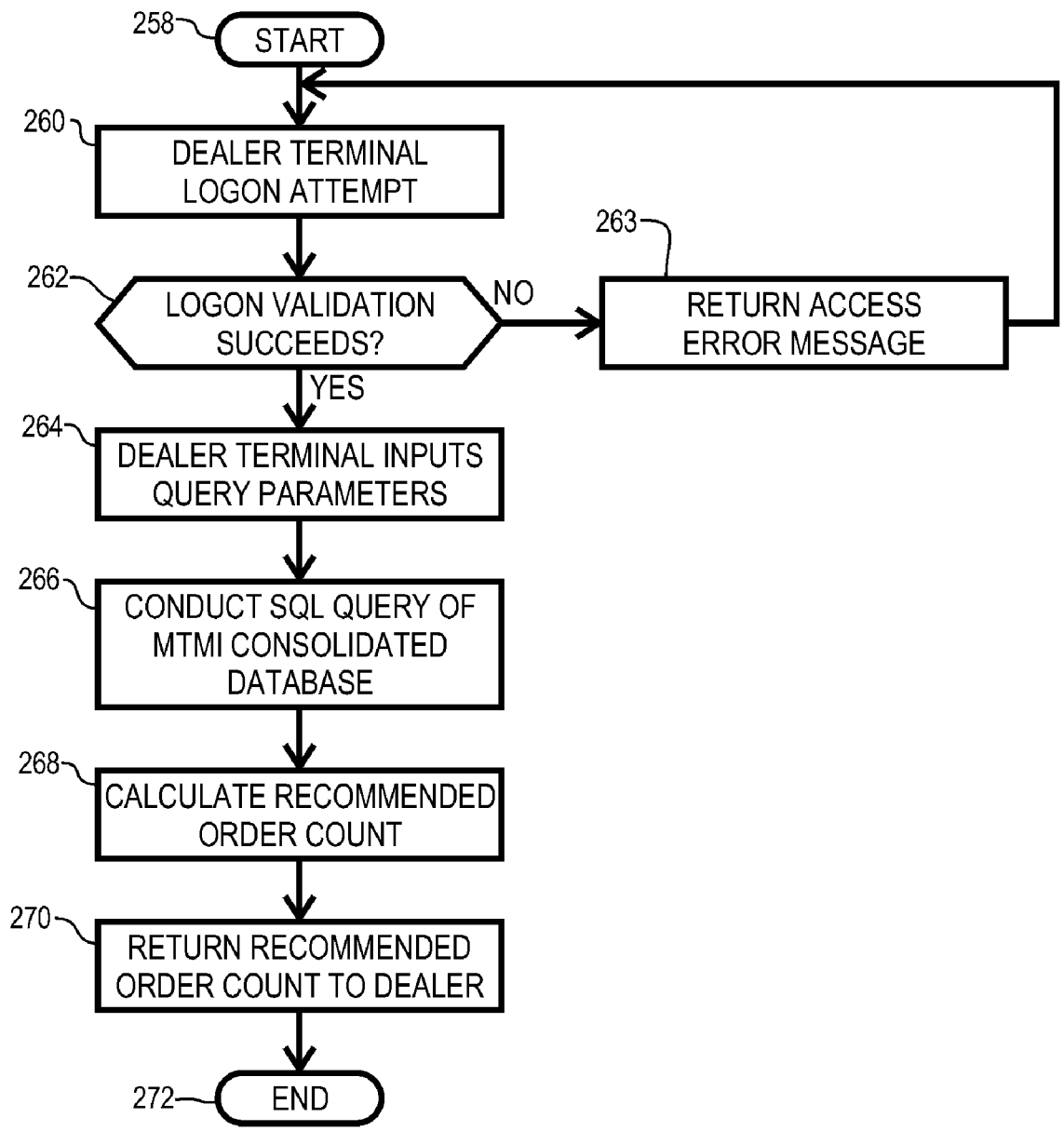
FIG. 9 is a dealer query process diagram according to an illustrative embodiment of the present invention.

Reference is directed to FIG. 9, which is a dealer query process diagram according to an illustrative embodiment of the present invention. FIG. 9 illustrates the dealer query process used to obtain a periodic vehicle order count report from the MTMI server. The process starts at step 258 and proceeds to step 260 where an agent of the dealer uses a dealer terminal to log in to the MTMI server via Internet connection. If the attempted logon fails at step 262, an access error is returned by the log in and validation process at step 263 and flow returns to step 260 for another log in attempt. On the other hand, at step 262, if the log in attempt succeeds then flow proceeds to step 264. At step 264, the agent for the dealer enters the query parameters pertinent to the upcoming forecast period. At step 266, the MTMI server conducts a SQL query of the dealer's consolidated database. At step 268, the MTMI server calculates the recommended periodic vehicle order count. At step 270 the recommended count is returned to the agent of the dealer and the process ends at step 272.

Figure 10A:
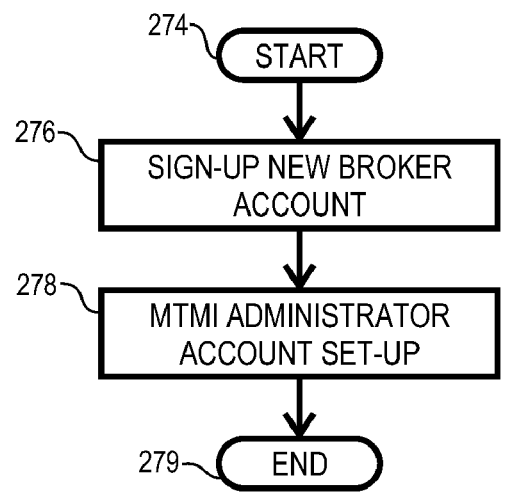
FIGS. 10A and 10B are broker interface process diagrams according to an illustrative embodiment of the present invention.
Figure 10B:
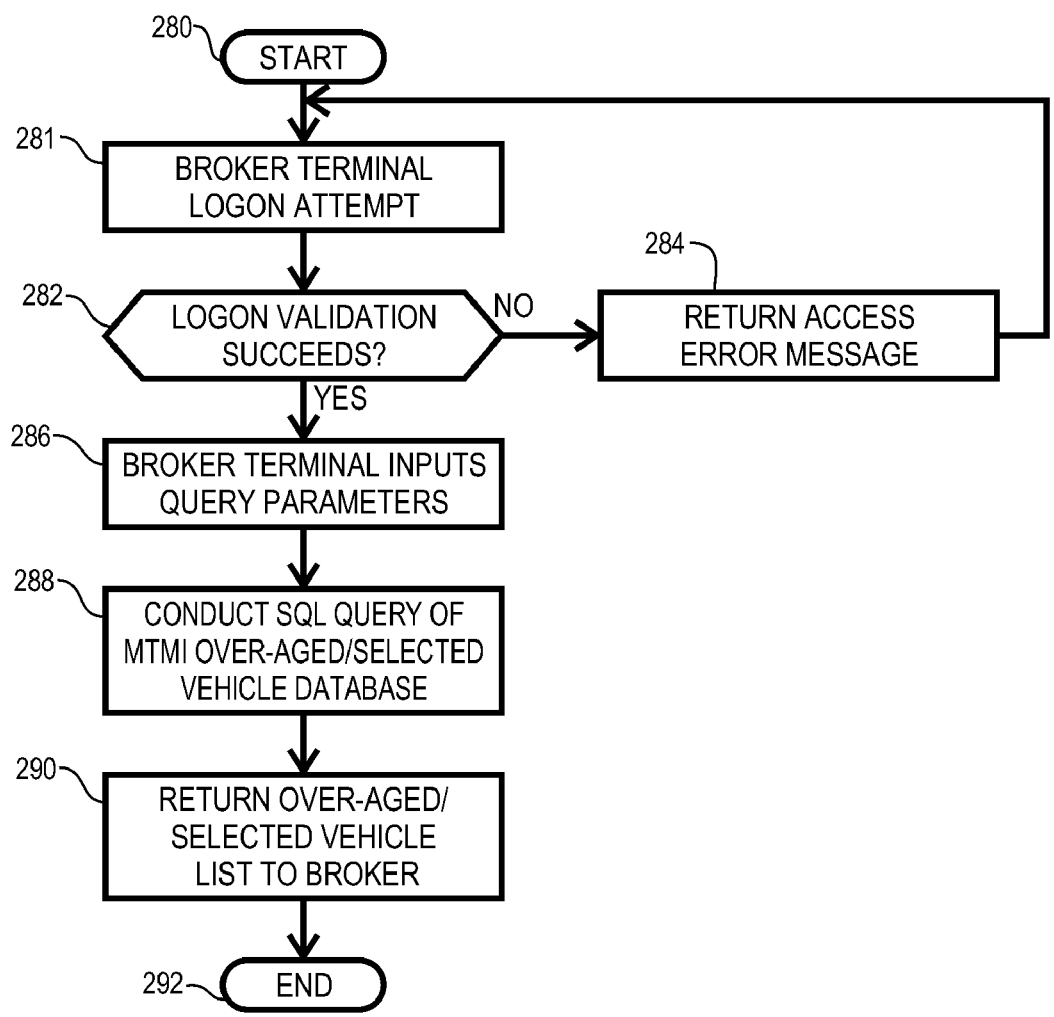

Reference is directed to FIG. 10A, which is a broker interface process diagram according to an illustrative embodiment of the present invention. FIG. 10A illustrates the sign-up process of a new broker account. The process begins at step 274 and proceeds to step 276 where a new broker account is established. At step 278, the MTMI administrator sets up the new broker account in the MTMI server, thereby giving access permission with username, log in password, and other permissions. At step 279, the sign-up process terminates. Reference is directed to FIG. 10B, which is a broker interface process diagram according to an illustrative embodiment of the present invention. FIG. 10B illustrates the broker access process. The process begins at step 280 and proceeds to step 281. At step 281, the broker uses a broker terminal to attempt a log in to the MTMI server via the Internet. If the attempted logon fails at step 281, an access error is returned by the log in and validation process at step 284 and flow returns to step 281 for another log in attempt. On the other hand, at step 282, if the log in attempt succeeds then flow proceeds to step 286. At step 286, the broker terminal is used to input over-aged vehicle search parameters. At step 288, the MTMI server conducts a SQL query of the over-aged/selected vehicle database. At step 290, the query results are returned to the broker terminal, and the process ends at step 292.

Figure 11:
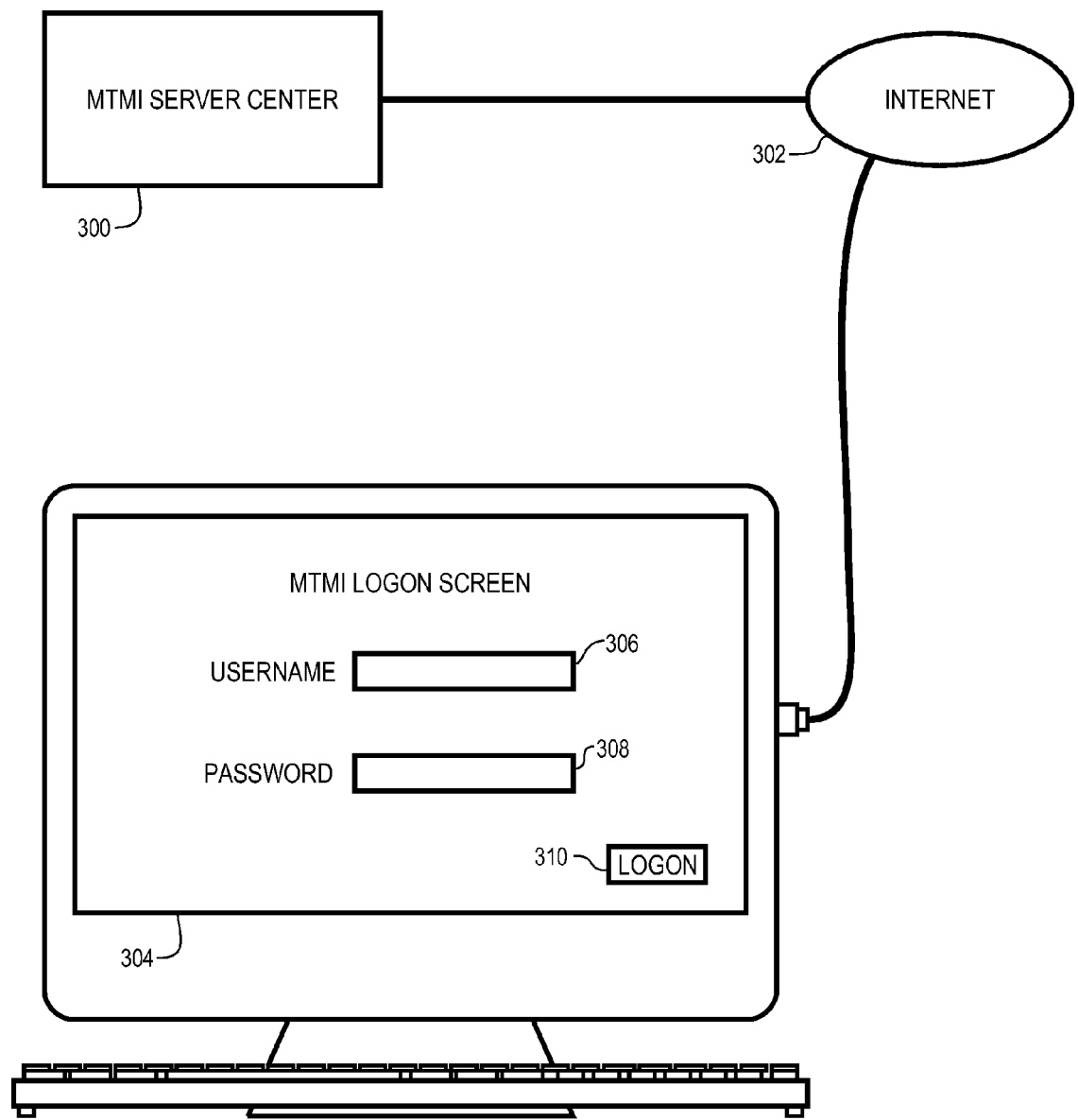
FIG. 11 is a terminal logon screen diagram according to an illustrative embodiment of the present invention.

Reference is directed to FIG. 11, is a terminal logon screen diagram according to an illustrative embodiment of the present invention. FIG. 11 illustrates a typical terminal access configuration through an Internet 302 connection to the MTMI server 300. The terminal 304 presents a logon screen with fields for the username 306 and the password 308, which are submitted by actuating the "LOGON" actuator 310.

Figure 12:
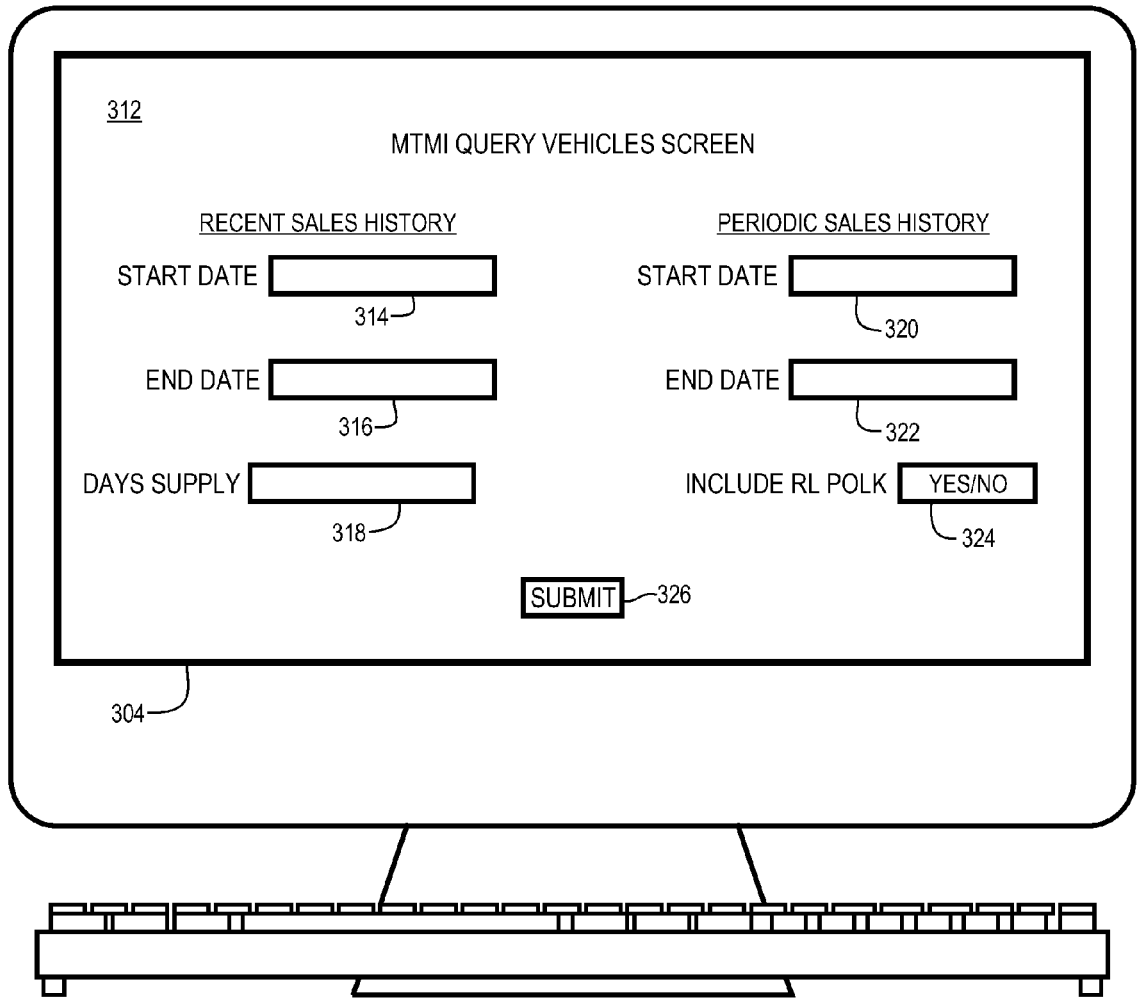
FIG. 12 is a terminal query access screen diagram according to an illustrative embodiment of the present invention.

Reference is directed to FIG. 12, which is a terminal query access screen diagram according to an illustrative embodiment of the present invention. The terminal access screen 312 is presented in a dealer terminal 304. The terminal access screen presents data fields form the "RECENT SALES HISTORY" period from a start date 314 to an end date 316. And also presents "PERIODIC SALES HISTORY" field for a start date 320 and an end date 322. The screen 312 also presents a field for defining the days supply requirement 318 and a choice of whether or not to include the RL Polk registration data 324. The query screen 312 is submitted by actuating the "SUBMIT" actuator 326.

Figure 13:
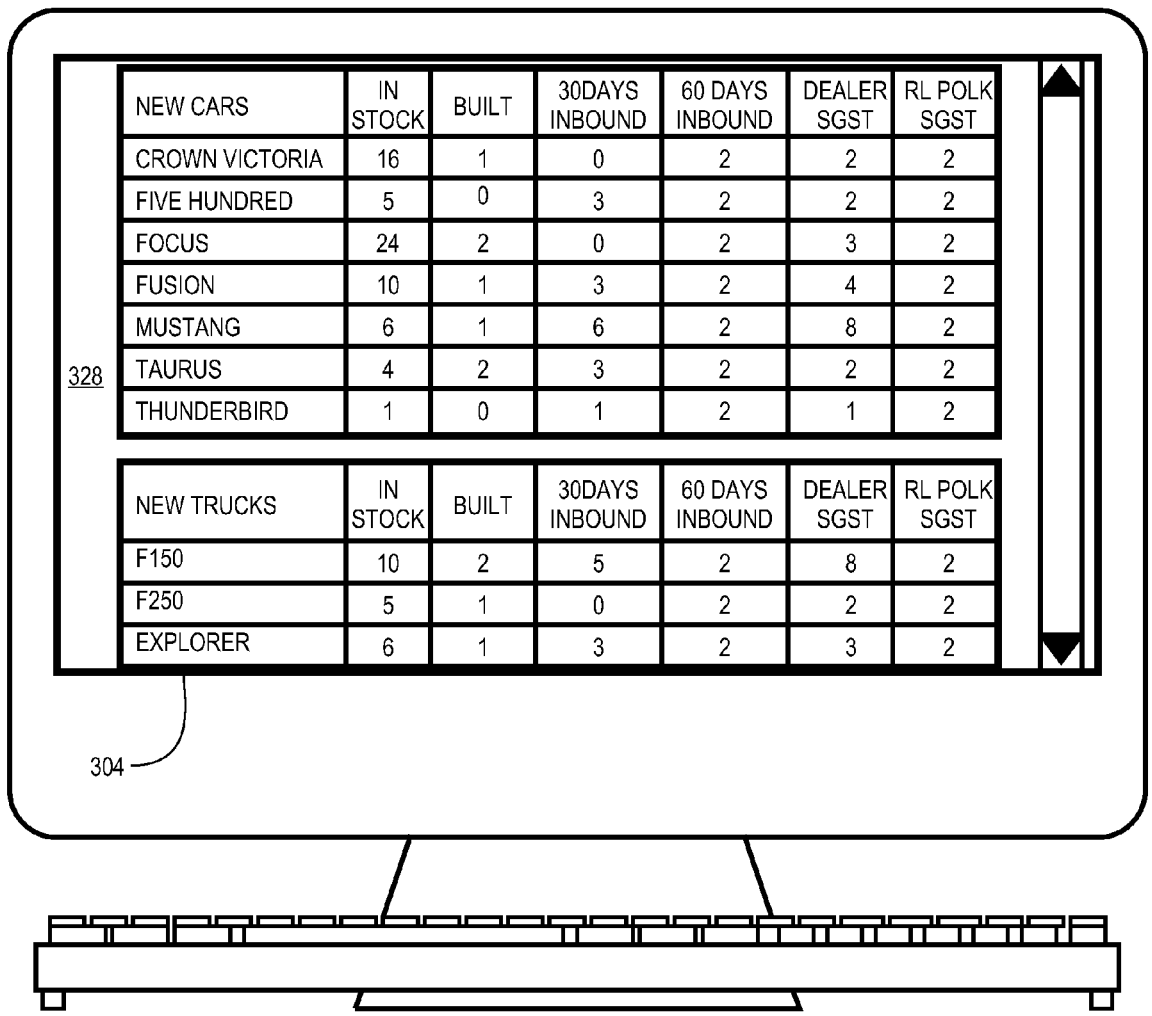
FIG. 13 is a dealer query report screen diagram for new vehicles according to an illustrative embodiment of the present invention.

Reference is directed to FIG. 13, which is a dealer query report screen diagram according to an illustrative embodiment of the present invention. The report screen 328 is presented on a dealer terminal 304 and presents a new vehicle periodic vehicle order count report created by the MTMI server. A listing of cars and trucks can be scrolled though on a model by model basis. For each model, the report presents the quantity in stock, the quantity "BUILT" status from the manufacture, as well as those at the 30 day inbound; and 60 day inbound; status. The recommended order count is presented both as the dealer suggested form, which is based on the dealer's sales history, etc., and the RL Polk factored suggested vehicle count.

Figure 14:
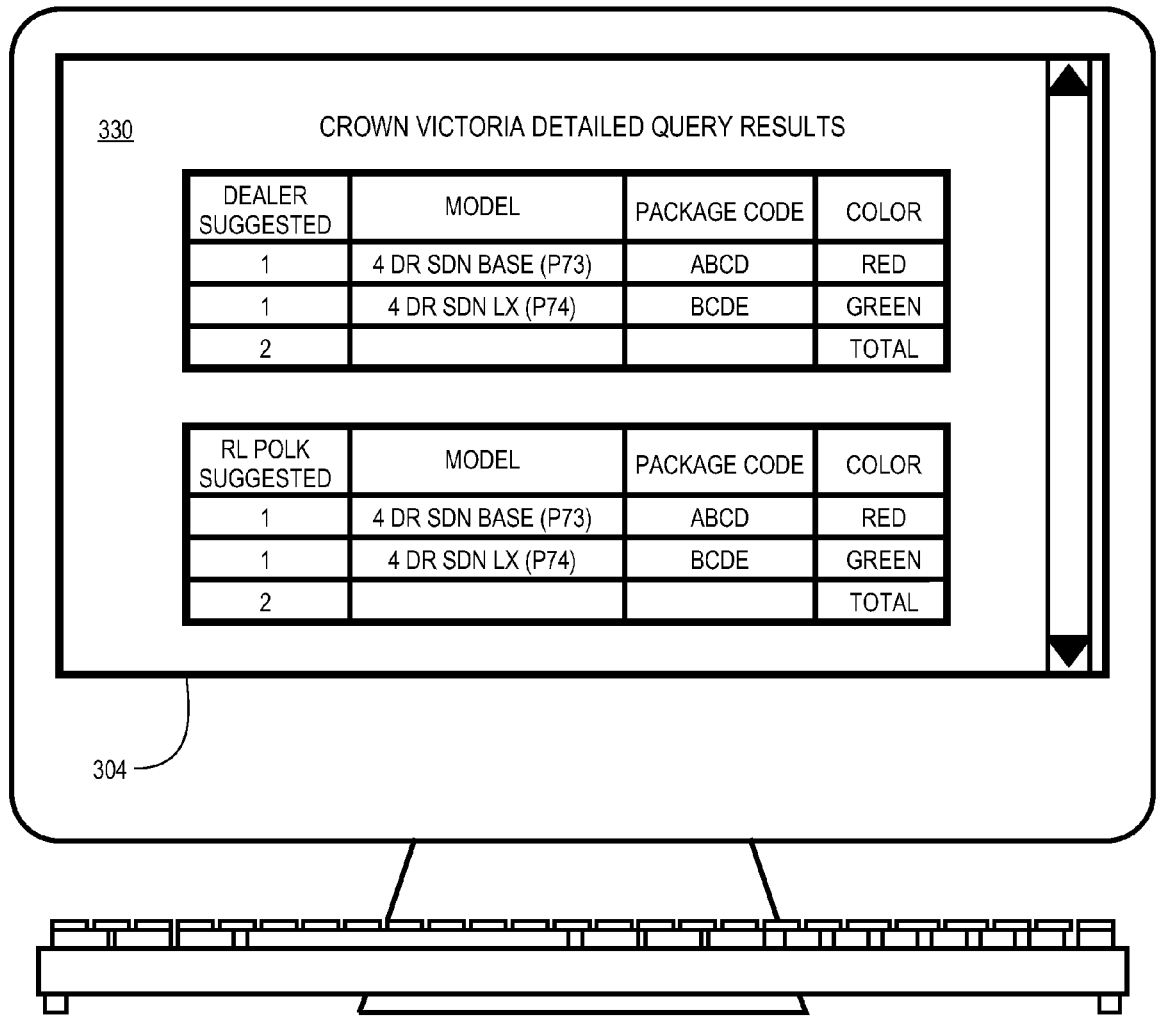
FIG. 14 is a detailed dealer query report screen diagram for new vehicles according to an illustrative embodiment of the present invention.

Reference is directed to FIG. 14, which is a dealer query report screen diagram according to an illustrative embodiment of the present invention. The dealer terminal 304 presents a detailed query screen 330 that is "drilled down" from the screen of FIG. 13 for the Ford Crown Victoria model, as an example. The level of detail now includes the model number and description, the preferred equipment package code, and the vehicle color. Two different order counts are recommended, one from the dealer's history, and one factored by the RL Polk data.

Figure 15A:
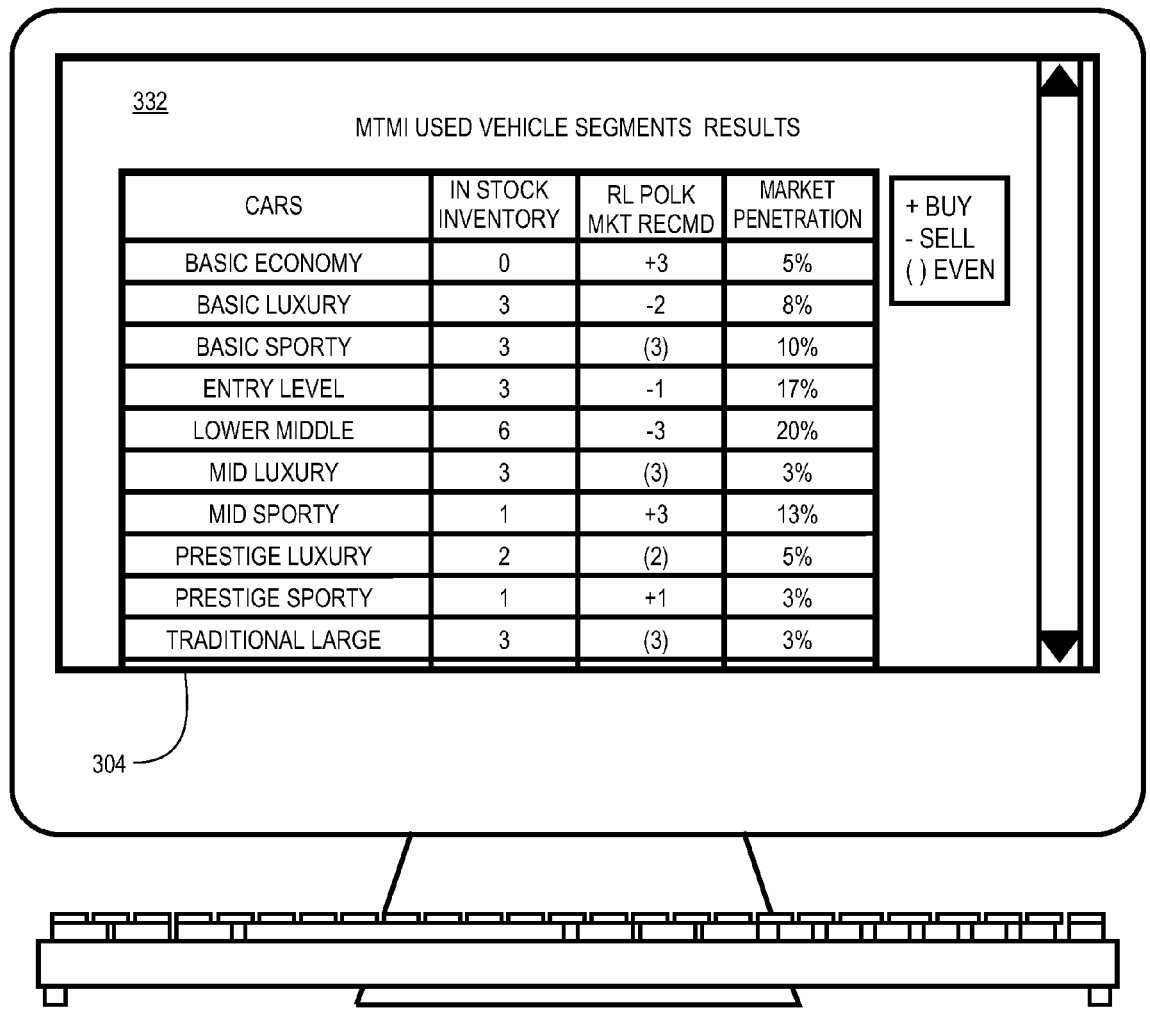
FIG. 15A is a dealer query report screen diagram for used vehicles, including registration data, according to an illustrative embodiment of the present invention.

Reference is directed to FIG. 15A, which is a broker query report screen diagram according to an illustrative embodiment of the present invention. The broker terminal 304 presents an over-aged vehicle query report 332 in FIG. 15A. The vehicles are presented as a list of vehicle types, which the agent for the dealer can scroll through. The list includes the type of vehicle, the number available, the RL Polk recommended vehicle order count, and an assessment of the market penetration, as illustrated. Note that the RL Polk recommended order count can include a number of vehicles to buy for addition into inventory, a number to sell out of inventory, or a number needed to maintain projected inventory levels. The market penetration percentage figures are based on dealer sales history as a function of the vehicles registered into the dealer's local market region, and can indicate opportunities for the dealer to attain better market penetration.

Figure 15B:
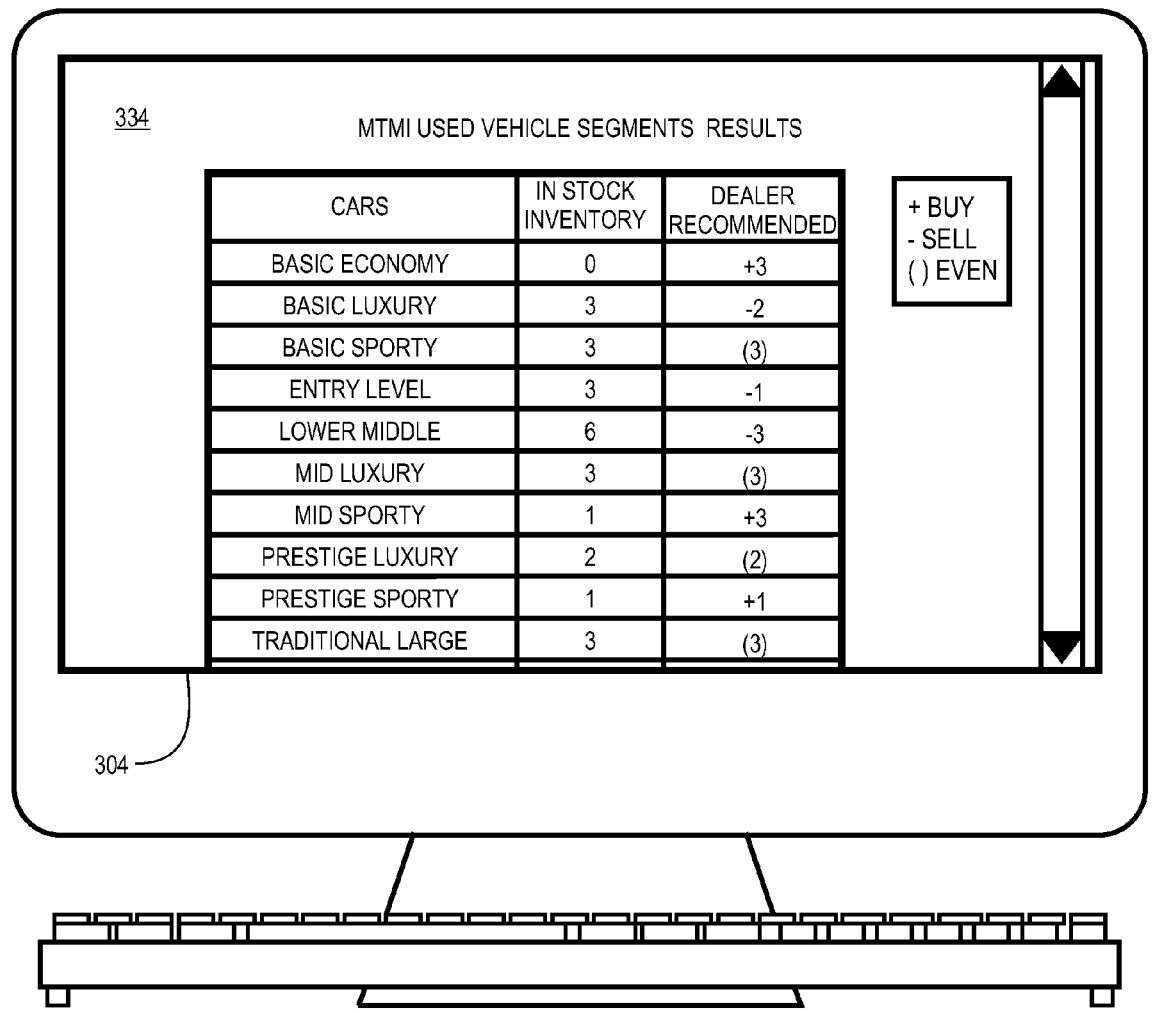
FIG. 15B is a dealer query report screen diagram for used vehicles, without registration data, according to an illustrative embodiment of the present invention.

Reference is directed to FIG. 15B, which is a dealer query report screen diagram according to an illustrative embodiment of the present invention. The broker terminal 304 presents a detailed listing screen 334, which is similar to the information presented in FIG. 15A, but omits the RL Polk based data. The screen 334 presents used vehicle inventory projections in the form of a vehicle type listing. The list 334 includes the level of "in stock" vehicles plus the realer recommended inventory adjustment, which includes level increase (+), level decrease (−), or level maintenance (even) vehicle acquisitions.

Figure 16A:
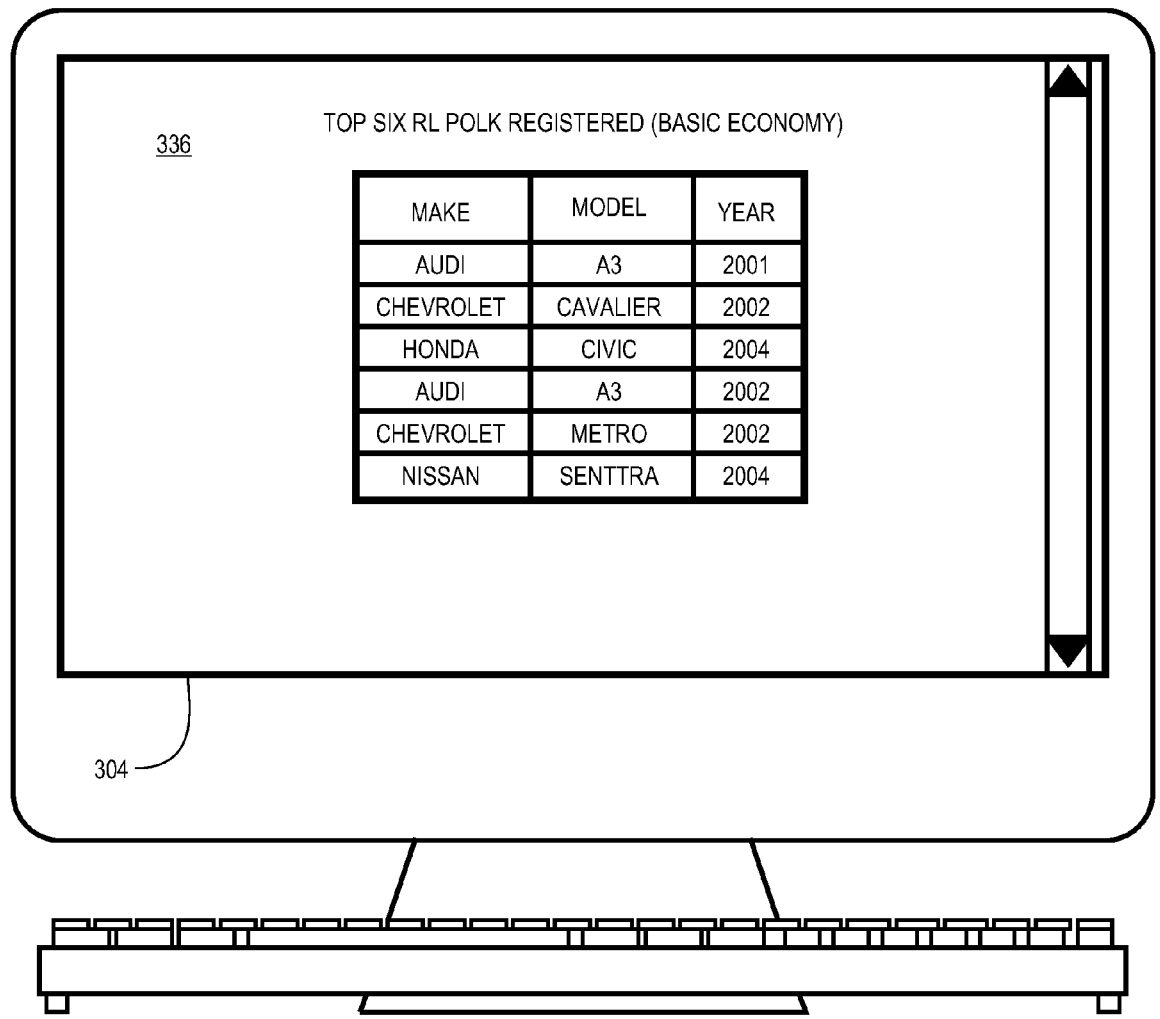
FIG. 16A is a detailed dealer query report screen diagram for used vehicles, including registration data, according to an illustrative embodiment of the present invention.

FIG. 16A is a dealer query report screen diagram according to an illustrative embodiment of the present invention. The broker terminal 304 presents a detailed listing screen 336 of the top six vehicle makes and models, by year, which are derived from the RL Polk based data. This information is useful to the dealership in its efforts to expand market penetration based on actual vehicle registrations within its local market region.

Figure 16B:
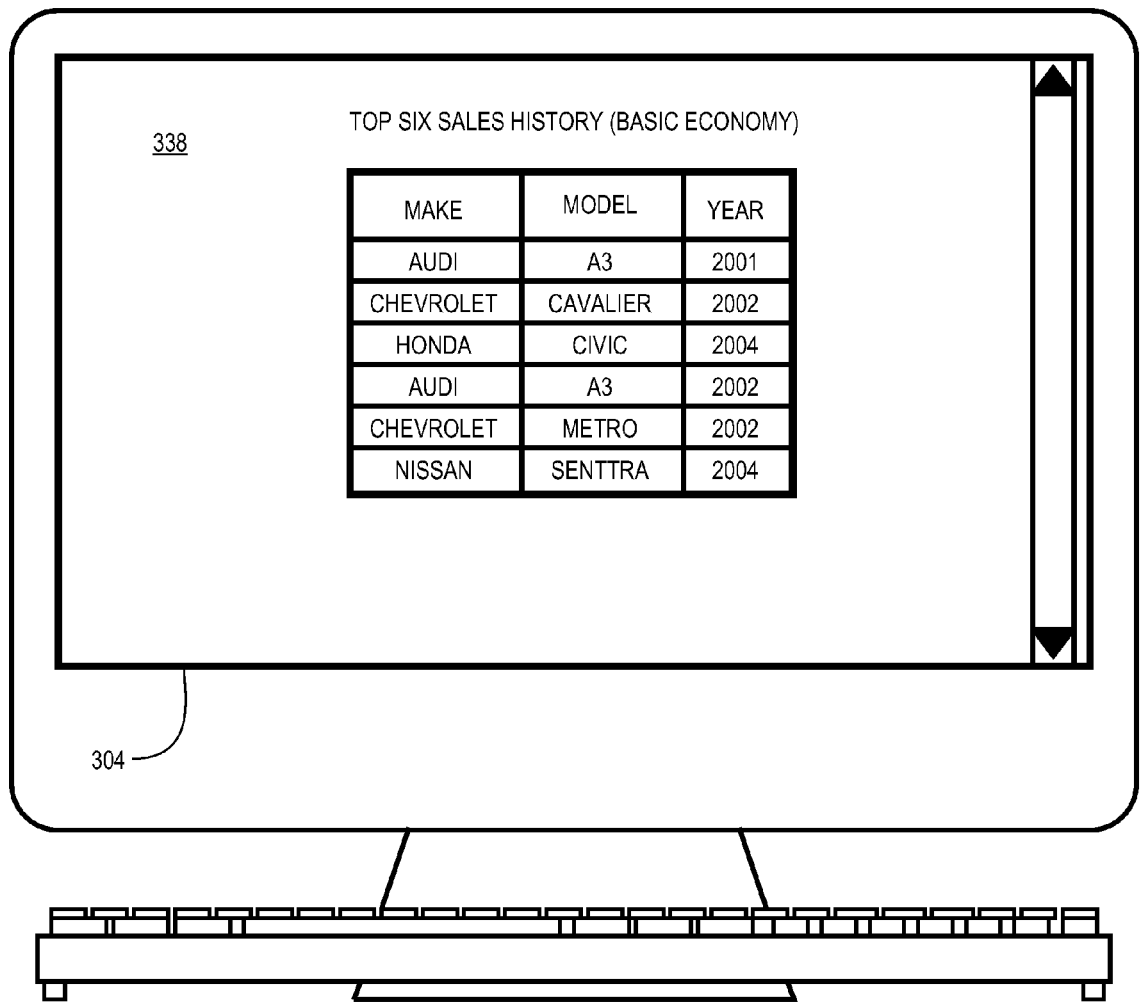
FIG. 16B is a detailed dealer query report screen diagram for used vehicles, without registration data, according to an illustrative embodiment of the present invention.

FIG. 16B is a dealer query report screen diagram according to an illustrative embodiment of the present invention. The broker terminal 304 presents a detailed listing screen 338 of the top six vehicle makes and models, by year, which were sold by the dealership, which is derived from the dealership sales history data. This information is useful to the dealership in its efforts to maintain market penetration based on actual sales history activity.

Figure 17A:
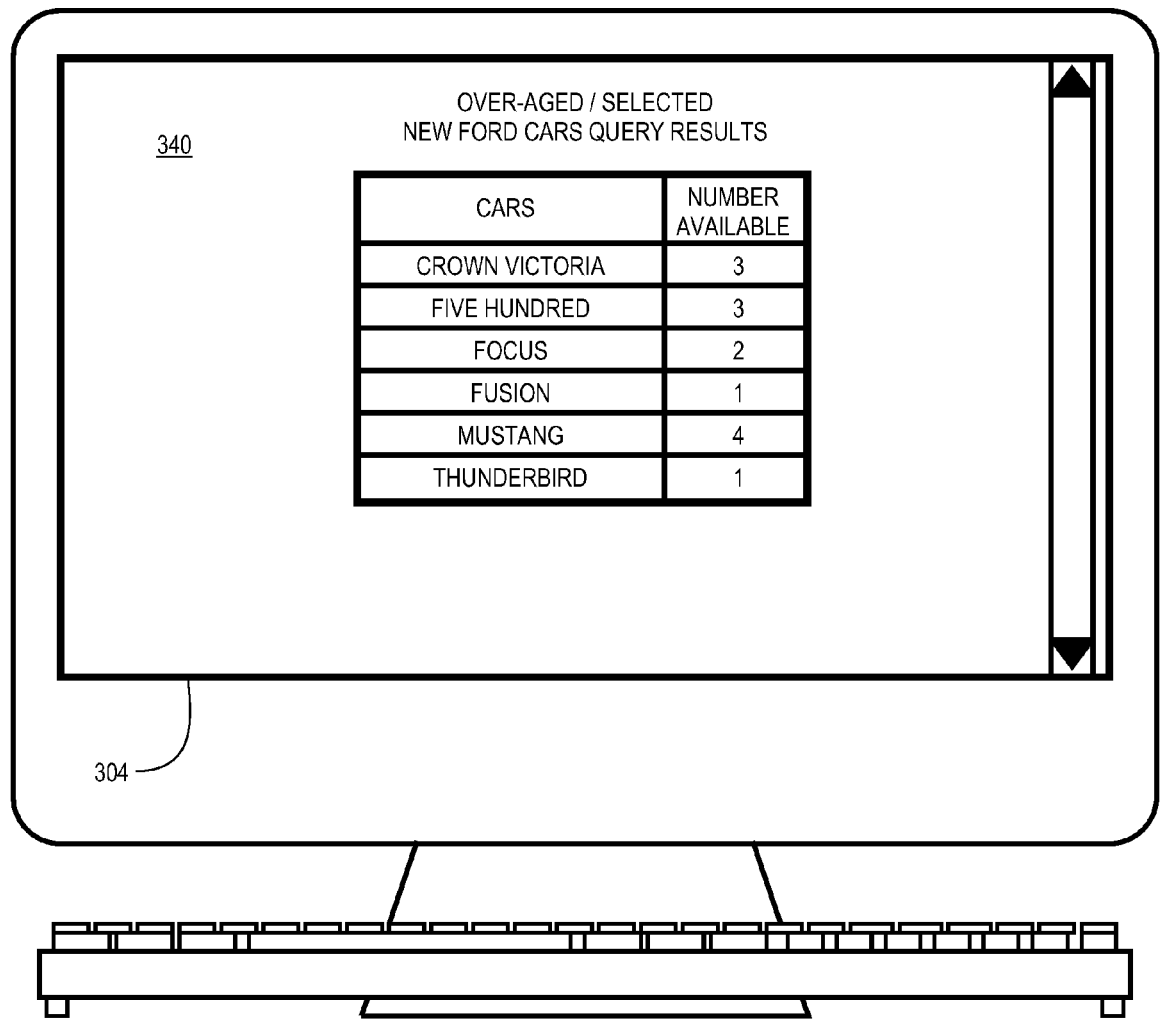
FIG. 17A is a broker query report screen diagram for new over-aged vehicles according to an illustrative embodiment of the present invention.

FIG. 17A is a broker query report screen diagram according to an illustrative embodiment of the present invention. The broker terminal 304 presents a screen 340 of information listing the new vehicles that are over-aged or selected for disposition by the dealership. The vehicles are listed by model, and include the number of vehicles available.

Figure 17B:
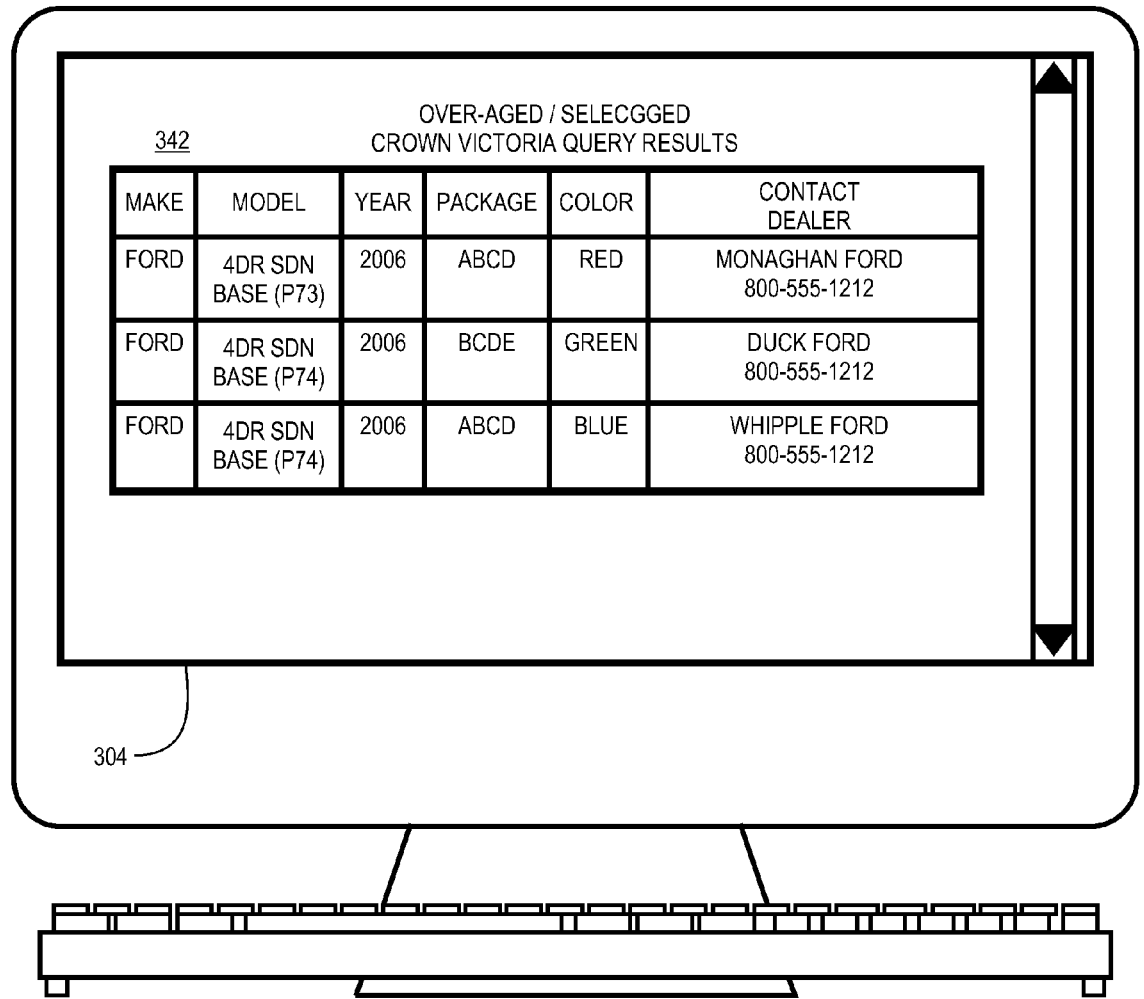
FIG. 17B is a detailed broker query report screen diagram for new over-aged vehicles according to an illustrative embodiment of the present invention.

FIG. 17B is a broker query report screen diagram according to an illustrative embodiment of the present invention. The broker terminal 304 presents a screen 342 of information listing the new vehicles that are over-aged or selected for disposition by the dealership. The screen 342 is a drill-down screen from that in FIG. 17A. In FIG. 17B, the particular model, Crown Victoria, vehicles are listed by make, model, year, package, and color. In addition, the dealer contact is listed.

Figure 18A:
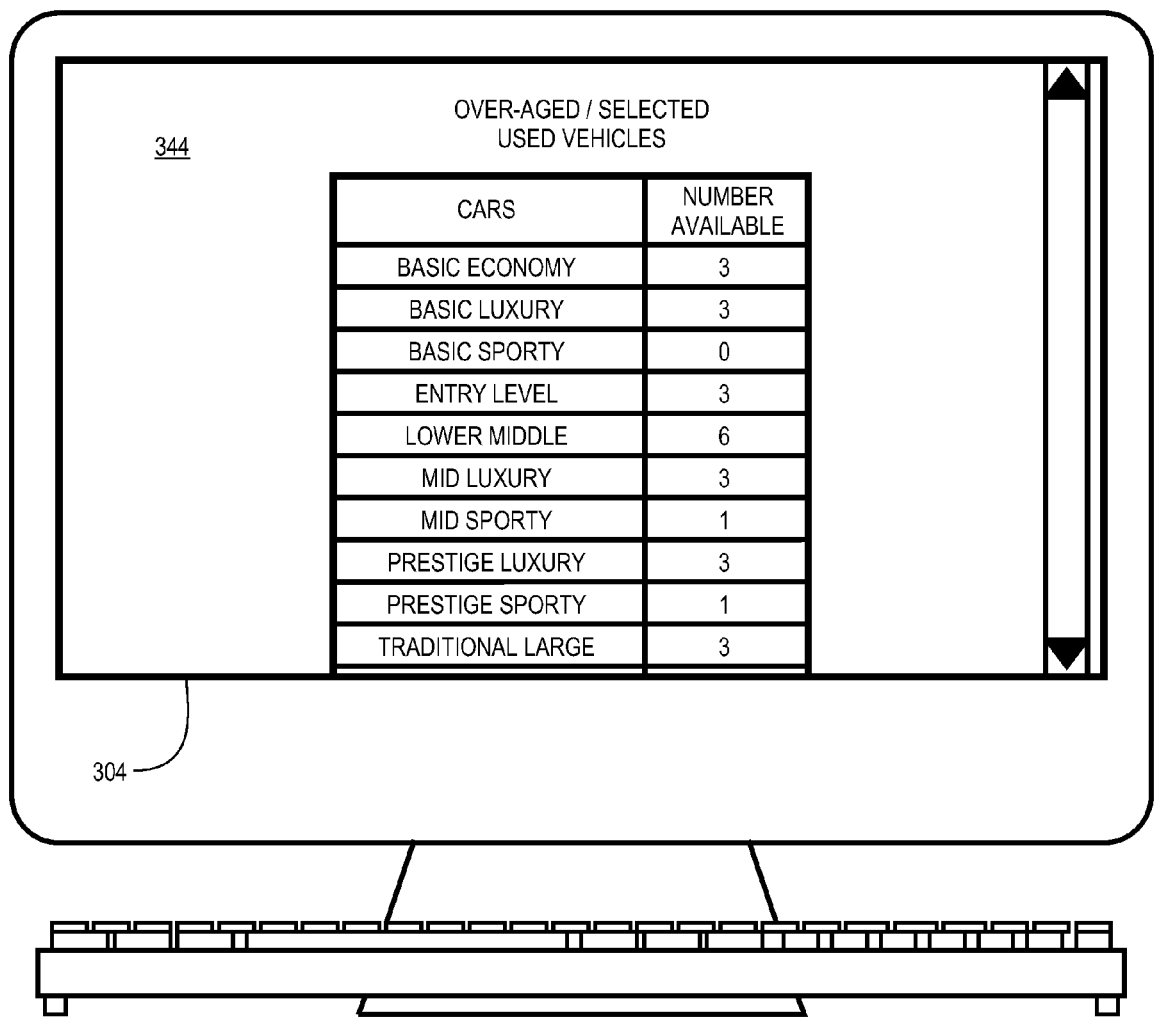
FIG. 18A is a broker query report screen diagram for used over-aged vehicles according to an illustrative embodiment of the present invention.

FIG. 18A is a broker query report screen diagram according to an illustrative embodiment of the present invention. The broker terminal 304 presents a screen 344 of information listing the used vehicles that are over-aged or selected for disposition by the dealership. The vehicles are listed by model, and include the number of vehicles available.

Figure 18B:
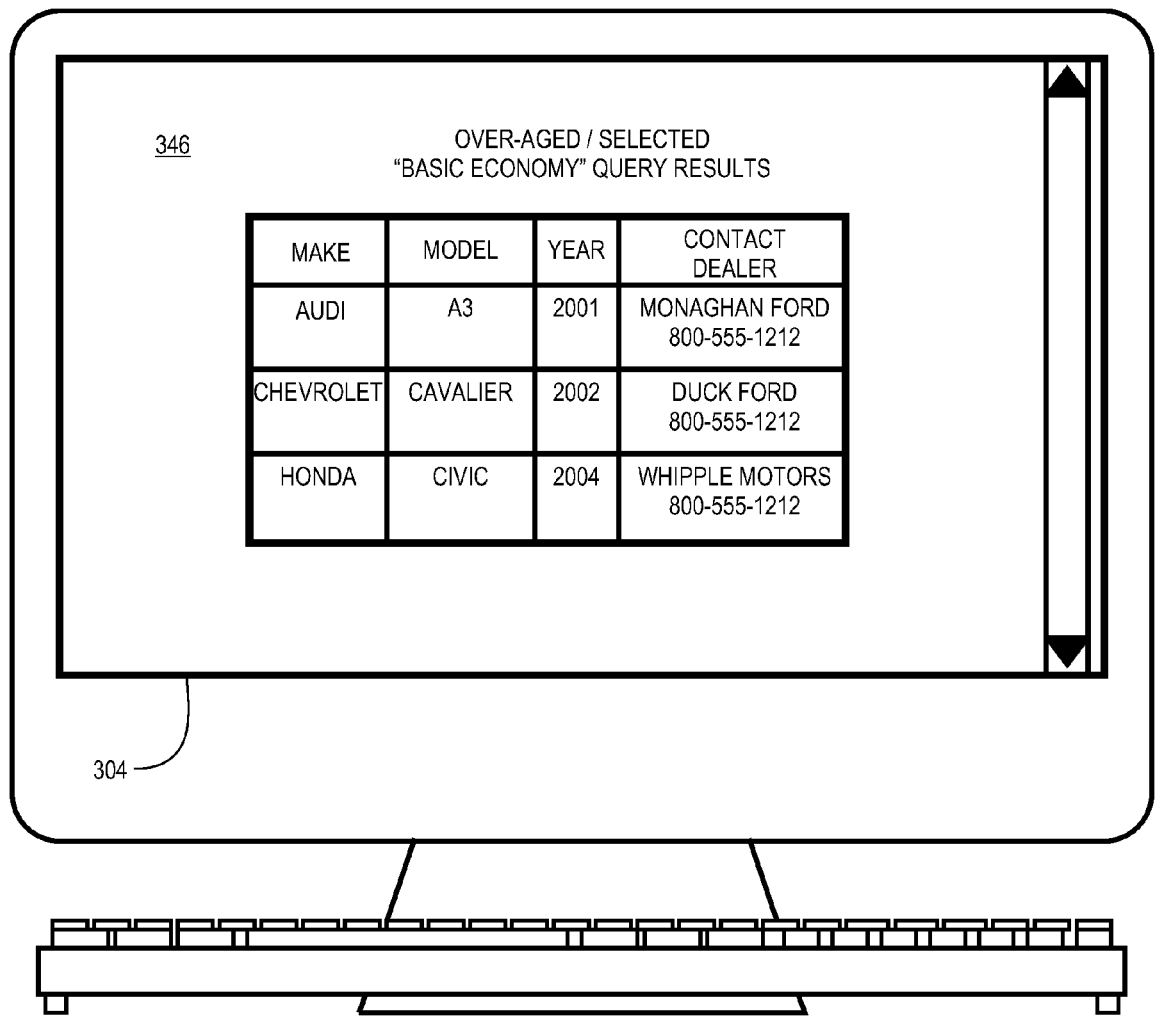
FIG. 18B is a detailed broker query report screen diagram for used over-aged vehicles according to an illustrative embodiment of the present invention.

FIG. 18B is a broker query report screen diagram according to an illustrative embodiment of the present invention. The broker terminal 304 presents a screen 346 of information listing the used vehicles that are over-aged or selected for disposition by the dealership. The screen 346 is a drill-down screen from that in FIG. 18A. In FIG. 18B, the particular make, model, and year are listed. In addition, the dealer contact is listed.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of providing a periodic vehicle order count recommendation for supplementing an inventory of a motor vehicle dealership to satisfy periodic market demand, comprising the steps of:

converting, by a computing device, a sales history database and an inventory database for the dealership into a dealership data structure stored in the computing device;

obtaining, from an agent of the dealership and entering into the computing device, query parameters including a specified sales history period, a forecast period, and a market region specification;

accessing a database of VIN numbers registered with a government agency, decoding VIN numbers registered within said market region, and storing resultant registered vehicle information into a regional vehicle registrations data structure, which is located in the computing device;

estimating, by the computing device, a periodic vehicle order count to satisfy market demand within said market region during said forecast period based on data recalled from said dealer database structure of inventory and sales history over said specified sales history period, and said registered vehicle information recalled from said regional vehicle registration data structure.

2. The method of claim 1 wherein said inventory database includes a current inventory portion and an inbound inventory portion that is organized by expected time before availability for sale by the dealership, and wherein
said inbound inventory portion is provided by a vehicle manufacturer.

3. The method of claim 1 wherein said regional vehicle registration data structure includes data fields for makes, models, options, equipment packages, or colors.

4. The method of claim 1 wherein said sales history database, said inventory database, and said periodic vehicle order count include used vehicles.

5. The method of claim 1 wherein said database of VIN numbers is provided by a third party provider of regional vehicle consumption data.

6. The method of claim 1, further comprising the step of:
creating an over aged vehicle data structure of current inventory that has been in said inventory longer than said forecast period.

7. The method of claim 6, further comprising the step of:
accessing said over aged vehicle data structure by a vehicle broker.

8. The method of claim 1 wherein said converting and said estimating steps are executed on a server-computer, and further comprising the step of:
accessing said server-computer through the Internet.

9. The method of claim 1 wherein said dealership data structure is comprised of data for plural motor vehicle dealerships.

* * * * *